(12) United States Patent
Sasaki et al.

(10) Patent No.: US 8,773,678 B2
(45) Date of Patent: Jul. 8, 2014

(54) MEDIA PROCESSING DEVICE

(75) Inventors: Toshiyuki Sasaki, Yamagata-mura (JP);
Nobuhiro Inoue, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 113 days.

(21) Appl. No.: 13/606,745

(22) Filed: Sep. 7, 2012

(65) Prior Publication Data

US 2013/0063752 A1     Mar. 14, 2013

(30) Foreign Application Priority Data

Sep. 9, 2011    (JP) .................. 2011-196893

(51) Int. Cl.
*G06F 3/12*     (2006.01)

(52) U.S. Cl.
USPC ............... 358/1.13; 358/474; 271/302

(58) Field of Classification Search
CPC ........... B65H 1/00; G03G 2215/00713; G03G 2215/00603; H04N 1/121
USPC ............... 358/474, 497, 498, 1.13; 271/264, 271/265.01, 306, 302; 399/405
See application file for complete search history.

(56) References Cited

U.S. PATENT DOCUMENTS

| | | | |
|---|---|---|---|
| 7,477,427 B2 | 1/2009 | Fujikawa et al. | |
| 7,515,866 B2* | 4/2009 | Togashi et al. | 399/381 |
| 8,544,984 B2* | 10/2013 | Kataniwa | 347/32 |
| 2006/0203033 A1 | 9/2006 | Jantzi et al. | |
| 2006/0210342 A1 | 9/2006 | Fujikawa et al. | |

FOREIGN PATENT DOCUMENTS

| | | |
|---|---|---|
| JP | 2001-018408 A | 1/2001 |
| JP | 2004-297761 A | 10/2004 |
| JP | 2009-226719 A | 10/2009 |

* cited by examiner

*Primary Examiner* — Dennis Dicker
(74) *Attorney, Agent, or Firm* — Nutter McClennen & Fish LLP; John J. Penny, V.

(57) ABSTRACT

A media processing device enables conveying media fed from different paths into a common path in a stable conveyance state to the scanning position of a scanner. A check processing device has a path switching member that selectively bridges a back path for conveying checks and a card path to a downstream path, which is a common path. The path switching member changes position and switches the connected paths in conjunction with movement of a shutter that covers the open part of a nozzle cap used to cap the nozzle face of the inkjet head at the back path.

14 Claims, 21 Drawing Sheets

MEDIA PROCESSING DEVICE

Priority is claimed under 35 U.S.C. §119 to Japanese Application No. 2011-196893 filed on Sep. 9, 2011, which is hereby incorporated in its entirety.

BACKGROUND

1. Technical Field

The present invention relates to a media processing device such as a check processing device having an optical reading unit that reads an image of a medium conveyed through a curved conveyance path. The invention relates more specifically to a media processing device that can scan images of both first media such as checks that bend easily, and second media such as driver's licenses and other cards that do not bend easily.

2. Related Art

Checks are commonly used in bank operations for settling deposit and withdrawal processes. When a check is used to settle a transaction, the date and signature on the check are confirmed at the teller window, the necessary deposit or withdrawal process is completed, and the check used in the transaction is then endorsed on the back. A receipt for the check process is then given to the customer. A driver's license or other type of identification card is typically required to confirm the identity of the person presenting the check, and a copy of the identification card may be taken and stored as needed. These processes must be frequently performed in a short time at the teller window.

Check processing devices that can perform these processes electronically are also available. This type of check processing device reads magnetic information from a check using a magnetic ink character reader (MICR), scans checks and ID cards with an internal optical scanner, and prints an endorsement on each check using an internal printer.

Such a device is described in Japanese Unexamined Patent Appl. Pub. JP-A-2004-297761. The data reader described in JP-A-2004-297761 uses an image scanning sensor disposed in the straight part of a check conveyance path that curves in a U-shaped configuration to read driver licenses and other types of identification cards that do not bend easily. More specifically, checks that bend easily are conveyed through a U-shaped check conveyance path, hard-to-bend cards are conveyed through a straight card path, and the common path through which both checks and cards are conveyed is a straight part of the U-shaped check conveyance path. Flexible media such as checks bend as they travel through the curved path, and are conveyed to the straight common conveyance path where the scanner is located. Both check processes and identity verification processes required for processing checks can thus be done efficiently using the data reader described in JP-A-2004-297761.

While a stamper or similarly simple mechanism can be used as the check endorsement printing device, using an inkjet head enables printing various kinds of information. When an inkjet head is used, however, a head maintenance mechanism must also be provided in order to prevent the nozzles from clogging when the inkjet head is not being used. The head maintenance mechanism has a nozzle cap for capping the nozzle face of the inkjet head. In this case, a mechanism for keeping the inside of the nozzle cap wet in order to prevent the nozzle cap from drying is also desirable as described in Japanese Unexamined Patent Appl. Pub. JP-A-2001-18408 and Japanese Unexamined Patent Appl. Pub. JP-A-2009-226719.

When both checks and cards are imaged by the scanner on the straight common conveyance path as described in the data reader in JP-A-2004-297761, checks and cards can become jammed at the junction where the check path and the card path merge into the common path. Cards can jam at this junction particularly easily when cards travel bidirectionally through the junction between the common path and the card path in the card scanning operation. For example, when the leading end of a card is bent and the card passes from the common path through the junction into the card path, the leading end of the card can hit the part of the junction where the card path and the check path diverge, resulting in the card becoming jammed.

The length of the check path may also be short relative to the length of the check in order to make the check processing device more compact, and the check is therefore read with the scanner while still passing through the conveyance path junction. The length of the card path is also short relative to the card length, and cards are read with the scanner while passing through the junction. As a result, when the leading end of a card or check is bent or folded and the card or check is conveyed from the card path or the check path through the junction into the common path, card or check conveyance can become unstable, and conveying the card or check at a constant speed past the scanning position of the scanner disposed in the common path may not be possible. The scanned image captured by the scanner may therefore be distorted, and reading the image accurately may not be possible.

When an inkjet head is used as the printing device for printing check endorsements, a head maintenance mechanism (nozzle cap) is needed as described above to prevent the nozzles from clogging. Because a dry nozzle cap can result in clogged nozzles, a mechanism for keeping the inside of the nozzle cap desirably wet is needed, but providing such a mechanism is undesirable in terms of reducing device size.

SUMMARY

An object of at least one embodiment of the invention is to provide a media processing device that can convey media in a consistent conveyance state to the scanning position of the scanner when a common scanner is used to read images of media conveyed from different conveyance paths into a common path.

Another object of at least one embodiment of the invention is to provide a media processing device that has an inkjet head as a media printing device, and can feed media in a consistent conveyance state from different paths to a scanning position on a common path by means of a small, compact mechanism that uses the motion of the head maintenance mechanism of the inkjet head.

One aspect of at least one embodiment of the invention is a media processing device that has a first path that conveys a first medium; a second path that conveys a second medium; a common path that conveys both the first medium and second medium from a junction between the first path and second path; a scanner that images the first medium or second medium passing through the common path; an inkjet head that prints on the first medium passing through the first path; a nozzle cap that can move to a capping position in which the nozzle face of the inkjet head is covered to keep the nozzle face wet, and an uncapped position separated from the nozzle face; a shutter that can move to a closed position in which the open part of the nozzle cap is closed at the uncapped position to keep the inside of the nozzle cap wet, and an open position separated from the open part; and a path switching member that can switch at the junction between a first position connecting the first path to the common path, and a second position connecting the second path to the common path, the path switching member switching from the first position to the second position in conjunction with the shutter moving from the closed position to the open position, and switching from the second position to the first position in conjunction with the shutter moving from the open position to the closed position.

When the nozzle cap is in the uncapped position, the shutter is in the closed position, and the path switching member that moves with the shutter is therefore switched to the first position in the media processing device according to this aspect of the invention, the inkjet head prints on the first medium conveyed through the first path, and the printed first medium is conveyed from the first path to the common path. An image of the first medium conveyed through the common path is also captured by the scanner disposed to the common path. Because the path switching member connects the first path to the common path at the junction between the first path and second path, the first medium does not become jammed at the junction, and the first medium passes smoothly through the junction. Because the first medium is conveyed at a constant speed when passing the junction while the inkjet head prints on the first medium, printing is not disturbed. Because the first medium is also conveyed at a constant speed when the first medium is imaged by a scanner on the common path while passing the junction, distortion is not introduced to the scanned image.

When the first medium is not being conveyed, printed, or scanned, the nozzle cap is in the capping position, the shutter is in the open position, and the path switching member that moves with the shutter is therefore switched to the second position. Because a path connecting the second path to the common path is created by the path switching member at the junction between the first path and second path when the second medium is conveyed through the second path and common path and the second medium is imaged by the scanner, the second medium will not jam at the junction and the second medium can pass the junction smoothly. When the second medium is imaged by the scanner on the common path while passing the junction, the scanned image will not be distorted because the second medium is conveyed at a constant conveyance speed.

The path switching member in the media processing device of the invention moves in conjunction with the shutter. A separate mechanism is not therefore not needed to change the position of the path switching member. When the switching of the path switching member is controlled by a mechanism other than the shutter, that is, the head maintenance mechanism of the inkjet head, an operating error can result in which the path switching member remains at the second position for passing the second medium even though the shutter is in the closed position (in other words, the inkjet head is printing on the first medium being conveyed through the first path). Because the path switching member changes position in conjunction with shutter movement in the invention, such operating errors can be significantly reduced.

By covering the open part of the nozzle cap with the shutter when the nozzle face of the inkjet head is not capped, the media processing device according to at least one embodiment the invention prevents evaporation of moisture from inside the nozzle cap. The inside of the nozzle cap can therefore be kept desirably moist without using a separate moisture retaining means or cleaning means. Compared with a configuration having a moisture retaining means or cleaning means that also requires a tank for the moisturizing fluid or cleaning fluid, a supply mechanism for supplying the moisturizing fluid or cleaning fluid from the tank, and a mechanism for recovering the moisturizing fluid or cleaning fluid supplied to the nozzle cap. This aspect of the invention requires only a shutter and a mechanism for moving the shutter, and can therefore reduce the amount of space needed to provide an inkjet printing device. The invention can therefore be used to provide a media processing device meeting strict size and compactness requirements.

In a media processing device according to another aspect of at least one embodiment of the invention, the nozzle cap can move between the uncapped position opposite the nozzle face of the inkjet head with the first path therebetween, and the capping position advanced across the first path to the nozzle face side and capping the nozzle face; the shutter can move along the first path between the closed position covering the open part of the nozzle cap in the uncapped position and the open position; and the path switching member is disposed adjacent to the shutter in a direction along the first path.

Because the first path, which is the conveyance path of the first medium, is defined by a media guide panel and other members disposed along the first path, space for installing and moving the shutter can be easily achieved along the back side of the media guide panel. In addition, by disposing the path switching member along the first path beside the shutter, a linking mechanism that switches the path switching member to the first position and second position using movement of the shutter along the first path can be provided using a simple mechanism without requiring a lot of space.

A media processing device according to another aspect of at least one embodiment of the invention also has a media guide disposed opposite the inkjet head with the first path therebetween; and a media guide opening formed in the media guide for moving the nozzle cap to and away from the nozzle face of the inkjet head. The shutter covers the media guide opening when in the closed position, and the shutter surface on the side of the shutter facing the first path functions in the closed position as a media guide surface that guides the first medium; a first surface of the path switching member on the side facing the first path functions in the first position as a media guide surface connecting the shutter surface to the common path guide surface located on the same side of the common path as the shutter surface; and a second surface of the path switching member on the side facing the second path functions in the second position as a media guide surface connecting a second path guide surface of the second path on the same side as the second surface to a common path guide surface of the common path located on the same side as the second path guide surface.

When the nozzle cap is disposed opposite the nozzle face of the inkjet head with the first path therebetween, a media guide opening is formed in the media guide opposite the nozzle face of the inkjet head so that the nozzle cap can move to and away from the nozzle face of the inkjet head. When the first medium is conveyed with the media guide opening exposed to the first path, the edge of the first medium can catch on an edge of the media guide opening, and paper jams can easily occur at the printing position of the inkjet head.

This aspect of the invention can reliably prevent such problems by covering the media guide opening with the shutter and guiding the first medium with the shutter. Because the shutter functions as a cover that keeps the inside of the nozzle cap desirably wet, a cover that closes the media guide opening, and a media guide (platen) that guides media past the printing position, a simple mechanism can be used, little installation space is required, and increase in the manufacturing cost can be suppressed compared with a configuration using plural different members for the same functions.

In addition, because the gap between the shutter surface and the guide surface on the same side of the common path is spanned by the first surface of the path switching member disposed adjacent to the shutter, the first medium can be guided smoothly along these surfaces from the first path to the common path. Furthermore, because the second surface spans the gap between the guide surface on the same side of the second path and the guide surface on the same side of the common path when the path switching member is switched to the second position, the second medium can be guided smoothly along these surfaces from the second path to the common path.

In a media processing device according to another aspect of at least one embodiment of the invention, the nozzle cap can move reciprocally between a retracted position separated further from the first path than the uncapped position, and the capping position reached through the uncapped position; and the nozzle cap contacts the shutter and the open part of the nozzle cap is covered when the shutter is in the closed position and the nozzle cap moves from the retracted position to the uncapped position, the shutter is held in the open position when the nozzle cap is in the capping position and while the nozzle cap moves from the capping position to the retracted position, the shutter moves from the open position to the closed position when the nozzle cap returns to the retracted position, and the nozzle cap advances from the retracted position to the uncapped position and the open part of the nozzle cap is covered after the shutter moves to the closed position.

With this aspect of the invention the shutter can be simply slid in the media conveyance direction, and does not need to be moved toward and away from the nozzle cap in a direction different from the sliding direction. A simple mechanism can therefore be used as the mechanism for driving the shutter, and little installation space is needed therefor.

A cam mechanism can be used as the mechanism for moving the path switching member with the shutter. For example, the path switching member can be made to pivot on a predetermined pivot axis and switch to the first position and second position, and a cam mechanism is used to convert reciprocal linear movement of the shutter between the closed position and the open position to rotating movement of the path switching member between the first position and the second position.

The media processing device of the invention can be used in a check processing device having a card scanning function used for customer identify verification. In this case, a magnetic reading unit that reads magnetic information from the first medium is disposed in the first path, the first path is a check path for conveying checks, and the second path is a card path for conveying cards.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a media processing device according to at least one embodiment of the present invention is described below with reference to the accompanying figures. The media processing device according to this embodiment of the invention is a check processing device that processes checks, which are a type of first media that bends easily. This check processing device has a card scanning mechanism for imaging driver licenses and similar documents, which are a type of second media that does not bend easily, for customer verification when processing checks, and a receipt printing mechanism for issuing receipts on which check processing information, for example, is printed. It will also be obvious that the invention can be similarly applied to media processing devices for processing first media that bend easily other than checks. The invention can also be applied to media processing devices that do not have a receipt printing mechanism.

Figure 1:
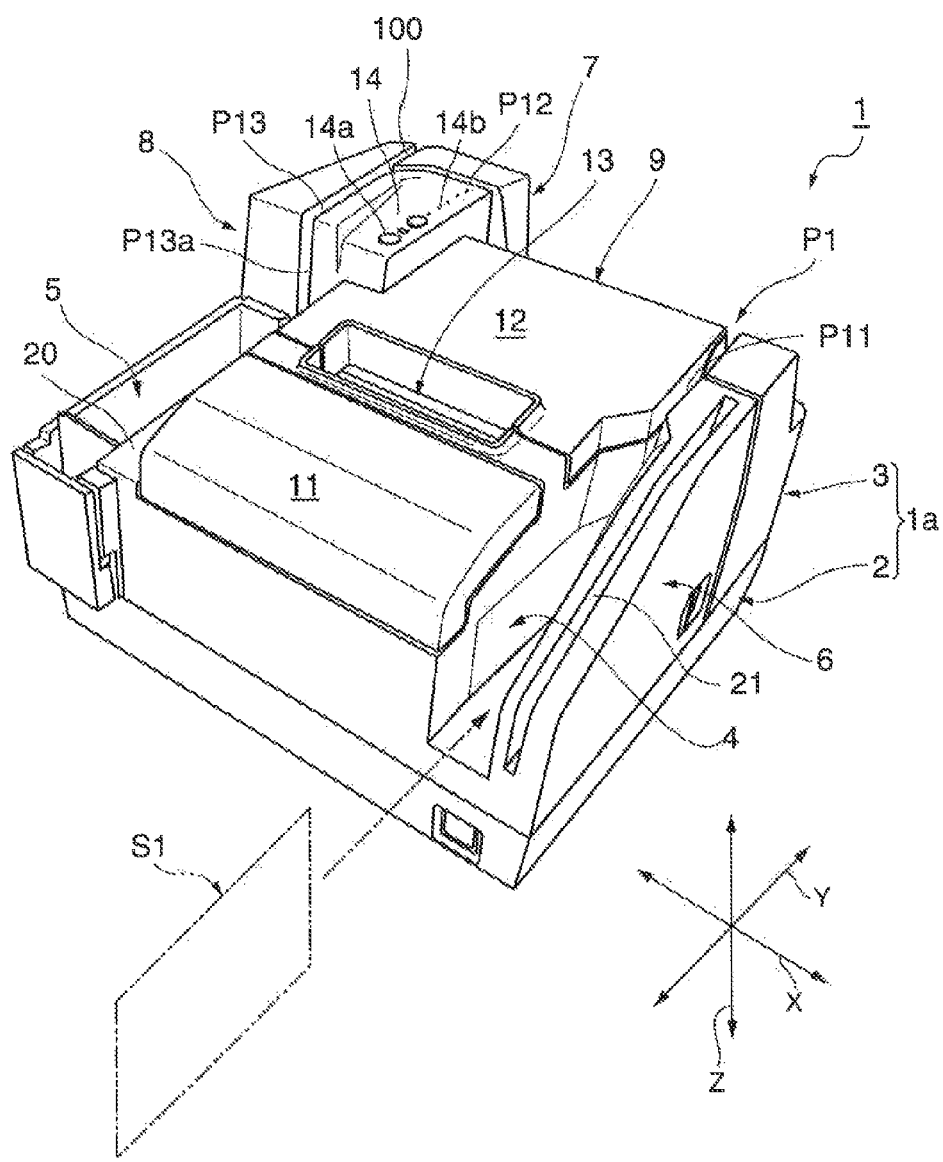
FIG. 1 is an oblique view showing a check processing device according to a preferred embodiment of the invention.
Figure 2:
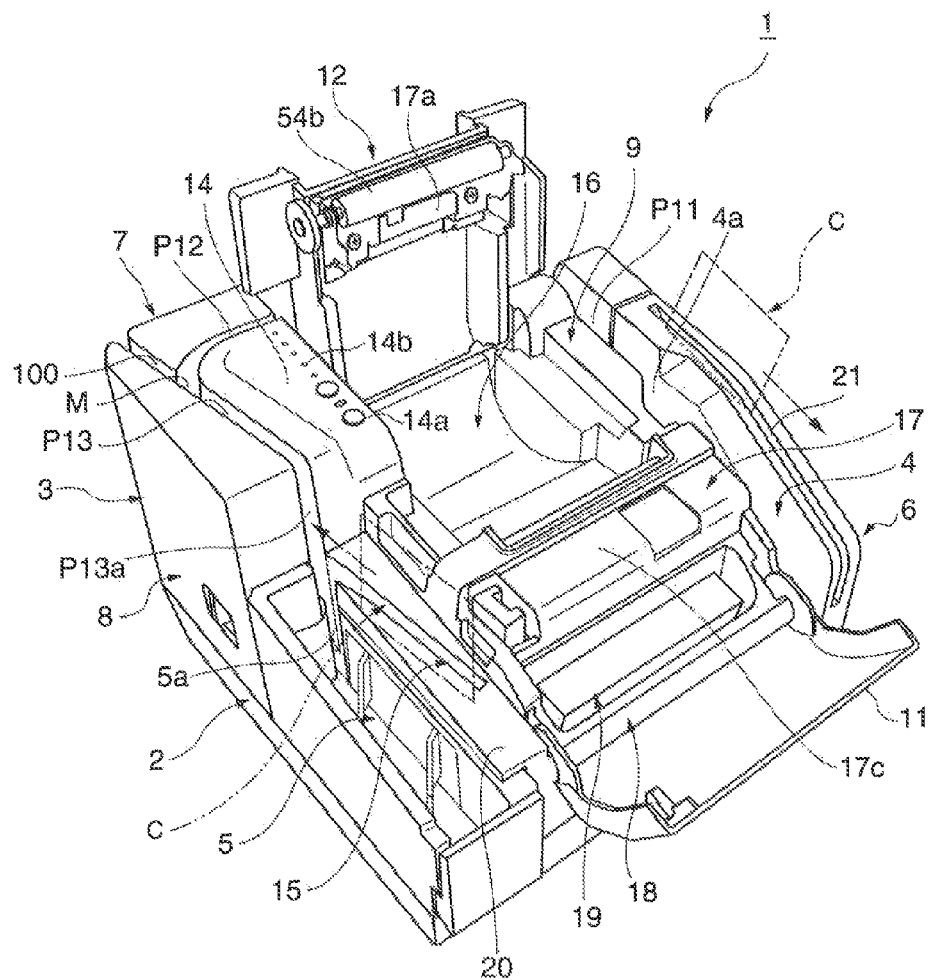
FIG. 2 is an oblique view of the check processing device shown in FIG. 1 with the two top covers open.
Figure 3:
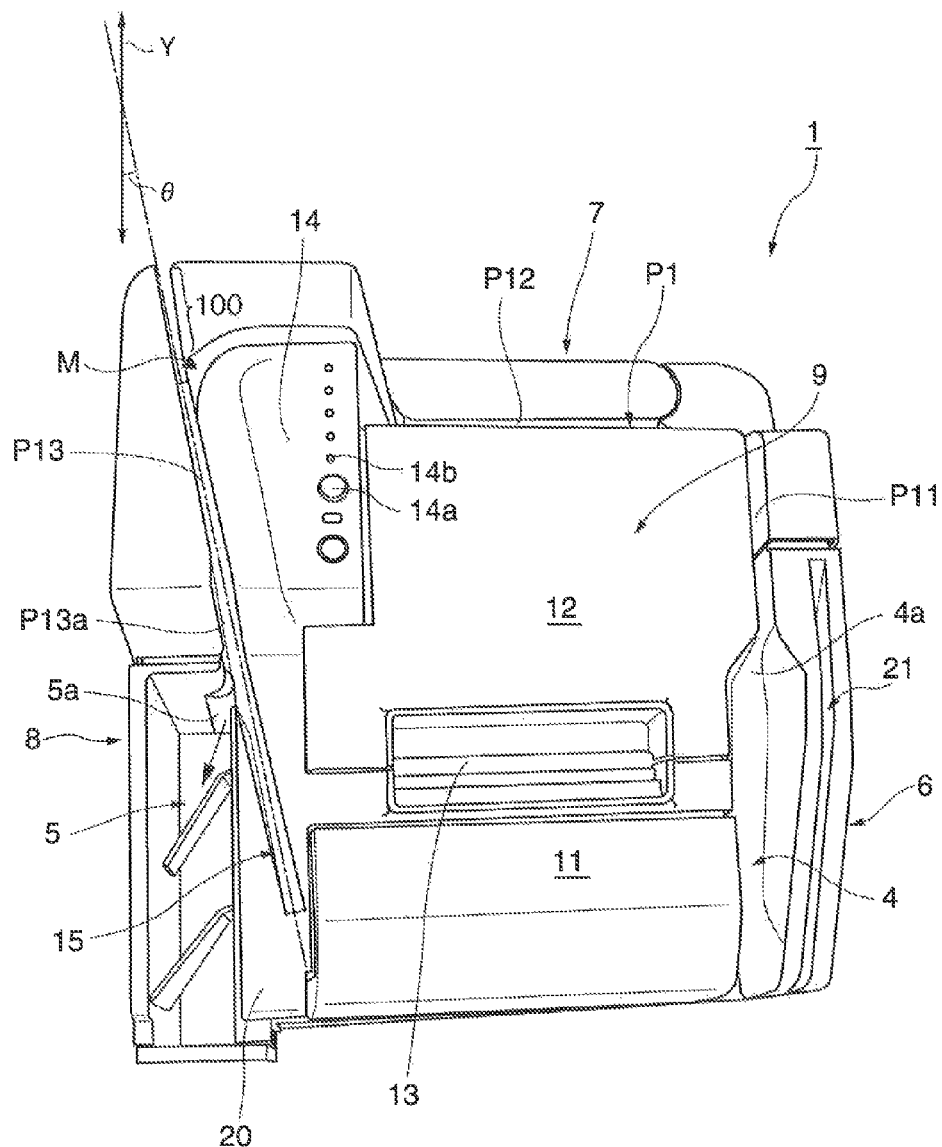
FIG. 3 is an oblique view of the check processing device shown in FIG. 1 when seen from above.

FIG. 1 is an oblique view of a check processing device according to a preferred embodiment of the invention from diagonally above the front right side. FIG. 2 is an oblique view of the check processing device from diagonally above the front left side with the front and back top covers open. FIG. 3 is an oblique view of the check processing device from the top front side.

Referring to these figures, the case 1a of the check processing device 1 includes a rectangular bottom case part 2 of a specific thickness, and a top case part 3 disposed thereabove. An entry pocket 4 to which a check S1 to be processed is inserted, a check path P1 (first path) through which the check S1 fed from the entry pocket 4 is conveyed, and an exit pocket 5 for recovering the check S1 delivered from the check path P1, are formed in the top case part 3. Reading magnetic ink character data from the check S1, printing an endorsement on the check S1, and imaging both sides of the check S1, are performed in this order while the check S1 is conveyed through the check path P1.

Note that when the check processing device 1 is placed in the normal upright operating position on a flat level surface as shown in FIG. 1, the side of the check processing device 1 facing the user is referred to below as the front, the opposite side as the back, the direction between this front and back is the longitudinal axis Y, the direction parallel to the level surface and perpendicular to the longitudinal axis Y is the transverse axis X, and the direction perpendicular to the level surface is the vertical axis Z.

The check conveyance path from the entry pocket 4 through the check path P1 to the exit pocket 5 is a vertical channel of a specific width that is formed in the top case part 3 and open at the top on the vertical axis Z. As shown in FIG. 1, a check S1 is inserted to the entry pocket 4 standing on edge with the long sides at top and bottom, and is conveyed through the check path P1 and discharged into the exit pocket 5 in this same posture. The check conveyance path is a substantially U-shaped path that opens to the front when seen in plan view.

More specifically, as will be understood from FIG. 3, the entry pocket 4 extends from the front toward the back of the top case part 3 on the right side of the transverse axis X, and the upstream path P11 portion of the check path P1 extends straight toward the back of the device from the check insertion opening 4a formed at the back end of the entry pocket 4. The downstream part of the upstream path portion P11 curves to the inside on the transverse axis X and joins the back path P12 portion of the check path P1. The back path P12 extends substantially straight on the transverse axis X, and the downstream end part thereof curves toward the front of the device and joins the downstream path P13 portion of the check path P1. The downstream path P13 is a straight path that is slanted an acute angle θ to the longitudinal axis Y to the inside of the device width, and in this embodiment of the invention, continues at an angle of approximately 10 to 20 degrees. The downstream end of the downstream path P13 connects through a check discharge opening 5a to the exit pocket 5. The exit pocket 5 continues to the front of the device on the longitudinal axis Y.

The top case part 3 is divided by this U-shaped check conveyance path into a right case member 6, rear case member 7, left case member 8, and an inside case member 9 located thereinside. A front cover 11, a back cover 12, a receipt exit 13 for the receipt printer described below, and an operating panel 14 are disposed on the top of the inside case member 9. A card insertion path 15 for inserting a card C to be read by the card scanner described below is also provided.

As will be understood from FIG. 2, the front cover 11 can open to the front while pivoting on a position at the front of the device, and the back cover 12 can open to the back pivoting on a position at the back of the device. The receipt exit 13 is formed between the distal end of the front cover 11 and the distal end of the back cover 12, and has a narrow rectangular shape extending widthwise to the device. The operating panel 14 is a substantially flat surface formed at the back side of the device on the left side of the back cover 12 at a slightly higher position, and has a plurality of operating switches 14a and a display unit 14b with a plurality of LEDs for indicating the operating status.

A roll paper compartment 16 is formed inside the inside case member 9 in the area covered by the back cover 12. When the back cover 12 opens, the roll paper compartment 16 is open to the top and roll paper not shown can be loaded or replaced. An automatic cutter 17 for cutting widthwise across the continuous paper delivered from the paper roll stored in the roll paper compartment 16 is disposed inside the inside case member 9 in the area covered by the front cover 11. Information corresponding to check information, for example, is printed on the continuous paper S2 conveyed from the paper roll stored in the roll paper compartment 16, and the trailing end of the printed portion is cut to issue a receipt of a specific length from the receipt exit 13. An ink cartridge compartment 18 is located toward the front of the device from the automatic cutter 17, and an ink cartridge 19, which is the ink supply source for printing checks, is installed therein. When the front cover 11 opens, the drive unit 17c of the automatic cutter 17 is exposed and the ink cartridge compartment 18 is open to the top, thus enabling the inspection of the automatic cutter 17 and replacement of the ink cartridge easily from the top of the device.

As will be understood from FIG. 2 and FIG. 3, the card insertion path 15 is formed in the flat top part 20 on the left side of the front cover 11 in the top of the inside case member 9. This top part 20 is at a lower position than the operating panel 14 there behind. The card insertion path 15 is a straight channel of a specific width and a specific depth that is open to the top in this top part 20. The rear end of the card insertion path 15 at the back of the device is connected to the top of the downstream end entrance P13a to the downstream path P13 portion of the check path P1, and the front end of the card insertion path 15 at the front side of the device is located near the side of the front cover 11. As will be understood from FIG. 3, the card insertion path 15 is a straight insertion path extending along an extension of the downstream path P13, which is a straight conveyance path, toward the device front. More specifically, the card insertion path 15 extends to the inside of the device in a direction slanted angle θ to the longitudinal axis Y.

A straight card path 100 that extends toward the back of the device from the downstream path P13 is formed from the back end of the downstream path P13, and the back end of the card path 100 opens to the back. The end of the card path 100 to the front of the device merges into the downstream path P13 at junction M at the downstream end in the check conveyance direction of the back path P12 portion of the check path P1. A straight path for cards C is thus formed by the card insertion path 15, downstream path P13, and card path 100. The downstream path P13 is a common path for conveying both checks S1 and cards C.

To scan an image of a card C that does not bend easily, the card C is inserted to the card insertion path 15 from the device front and pushed to the back as indicated in FIG. 2. The length of the card C is detected while the card C pushed into the card insertion path 15 is fed from the card insertion path 15 through the downstream path P13 and into the card path 100. While the card C is then conveyed from the card path 100 through the downstream path P13 to the card insertion path 15, the card C is imaged by the optical reader 43 (see FIG. 4) described below for scanning checks that is disposed to the downstream path P13.

A card slot 21 for reading magnetic information from cards C that do not bend easily is also formed in the check processing device 1 according to this embodiment of the invention. This card slot 21 is formed in the top part of the right case member 6 of the top case part 3. A magnetic reader (not shown) is disposed inside this right case member 6, and magnetic information stored on the card C is read by pulling the card C through the card slot 21.

Internal Configuration

Figure 4:
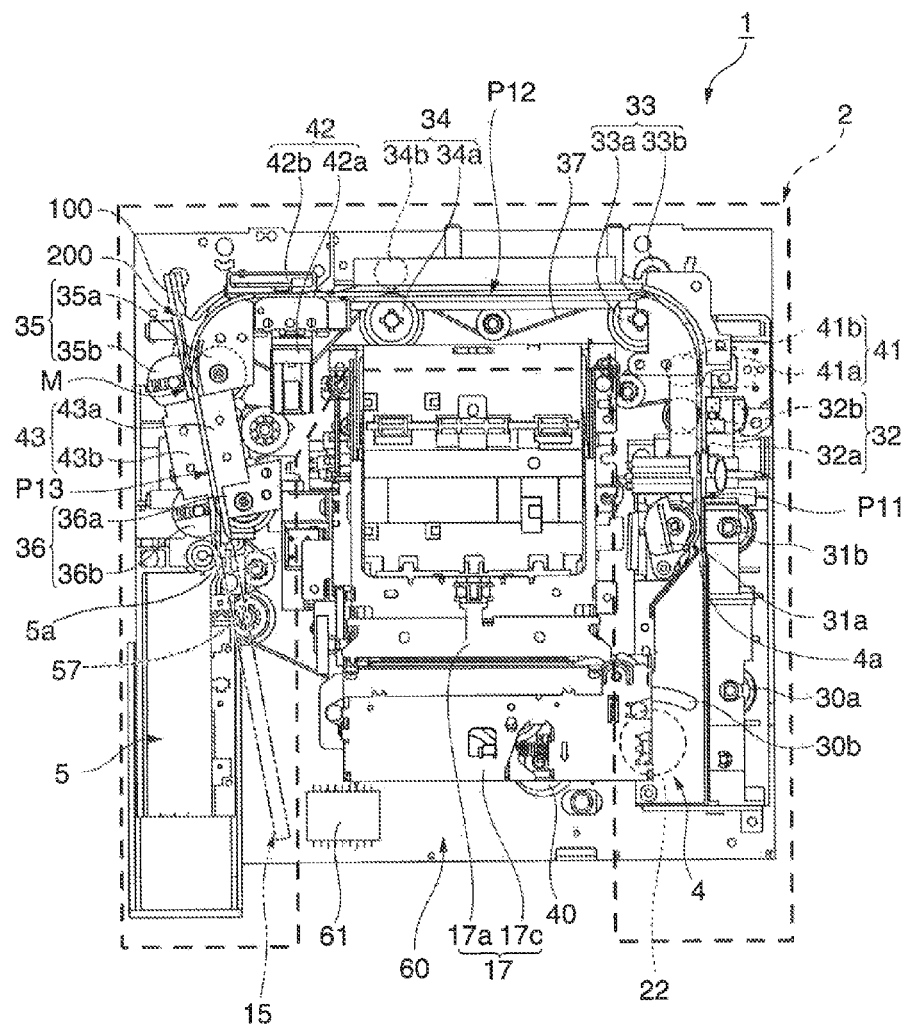
FIG. 4 shows the configuration of the check conveyance mechanism in the check processing device shown in FIG. 1.

FIG. 4 shows the internal configuration of the check processing device 1 focusing on the check conveyance mechanism for conveying a check S1 through the U-shaped check conveyance path. The internal configuration of the check processing device 1 described with reference to this figure focuses on the check conveyance mechanism.

A paper feed roller 30a is disposed to the side on the right case member 6 side of the entry pocket 4, and a pressure member 30b is disposed to the side on the inside case member 9 side. The pressure member 30b pushes a check S1 inserted to the entry pocket 4 to the paper feed roller 30a side. The check S1 is fed into the upstream path P11 of the check path P1 by the paper feed roller 30a, which is driven by an in-feed motor 22. In this embodiment, the check S1 is inserted standing on edge to the entry pocket 4 with the back of the check facing the inside of the device (the inside case member 9 side).

A feed roller 31b that feeds the check S1 supplied from the entry pocket 4, and a retard roller 31a that faces the feed roller 31b with the upstream path P11 therebetween, are disposed in the upstream path P11 portion of the check path P1. The feed roller 31b is driven by the in-feed motor 22, and turns synchronously with the paper feed roller 30a. The retard roller 31a is urged to the feed roller 31b side, and separates and feeds the checks S1 one at a time downstream.

A plurality of conveyance roller pairs 32 to 36 are disposed in the conveyance path parts of the check path P1 downstream from the feed roller 31b. Conveyance roller pair 32 is disposed in the upstream path P11, conveyance roller pairs 33 and 34 are disposed in the back path P12, and the remaining conveyance roller pairs 35 and 36 are disposed to the downstream path P13. Each of the conveyance roller pairs 32 to 36 has a drive roller 32a, 33a, 34a, 35a, 36a on the inside case member 9 side, and a follower roller 32b, 33b, 34b, 35b, 36b on the outside right case member 6, rear case member 7, or left case member 8 side opposite the corresponding drive roller with the check path P1 therebetween. The drive rollers 32a, 33a, 34a, 35a, 36a are synchronously driven rotationally by a drive motor 40 through an endless belt 37. The follower rollers 32b, 33b, 34b, 35b, 36b are urged by an urging member not shown to the corresponding drive roller 32a-36a side.

A magnetic reading unit 41 is disposed in the upstream path P11 of the check path P1. The magnetic reading unit 41 has a magnetic scanner 41a that can read magnetic information recorded in magnetic ink, for example, on the check S1, and the magnetic scanner 41a is disposed in the right case member 6 with the magnetic reading surface facing the upstream path P11. A pressure roller 41b is disposed opposite the magnetic reading surface of the magnetic scanner 41a with the upstream path P11 therebetween. The conveyed check 51 is pressed to the magnetic reading surface of the magnetic scanner 41a by the pressure roller 41b, and the magnetic information is reliably read by the magnetic scanner 41a.

A print unit 42 that prints an endorsement on the back of the check 51 is disposed in the back path P12, which extends continuously from the downstream end of the upstream path P11 widthwise to the device, in an area on the left corner side of the device. The print unit 42 includes an inkjet line head 42a extending vertically to the device with the nozzle surface of the inkjet head 42a facing the back path P12. A head maintenance mechanism 42b for the inkjet head 42a is disposed on the rear case member 7 facing the nozzle surface with the back path P12 therebetween. As described with reference to FIG. 2, the ink supply source of the inkjet head 42a is the ink cartridge 19 loaded in the ink cartridge compartment 18. Using a line head as in this embodiment is desirable because the print unit 42 can be made more compact than when a serial head is used.

A path switching member 200 that changes position in conjunction with the head maintenance mechanism 42b is disposed in the junction M of the back path P12 of the check path P1 and the card path 100. As described in further detail below, the path switching member 200 can switch between a first position connecting the back path P12 with the downstream path P13 (common path), and a second position connecting the card path 100 with the downstream path P13 (common path). Entry to the card path 100 is closed in the first position, and entry to the downstream end of the back path P12 is closed in the second position in this embodiment.

The conveyance roller pairs 35 and 36 are disposed in the downstream path P13 (common path), and the optical reader 43 for imaging both sides of the check S1 is disposed in the portion of the conveyance path between these roller pairs. The optical reader 43 has an optical scanner 43a for imaging the back of the check S1 and an optical scanner 43b for imaging the front disposed with the scanning surfaces thereof facing each other with the downstream path P13 therebetween.

The downstream end of the downstream path P13 is connected to the check discharge opening 5a that discharges the processed check 51 after reading magnetic information, printing an endorsement, and imaging are completed into the exit pocket 5. The exit pocket 5 is open at the top, and a check 51 deposited into the exit pocket 5 can be removed from above. Because both the entry pocket 4 and exit pocket 5 are open at the top, the operator can always handle checks 51 from above the front of the check processing device 1.

Receipt Printing Mechanism

Figure 5:
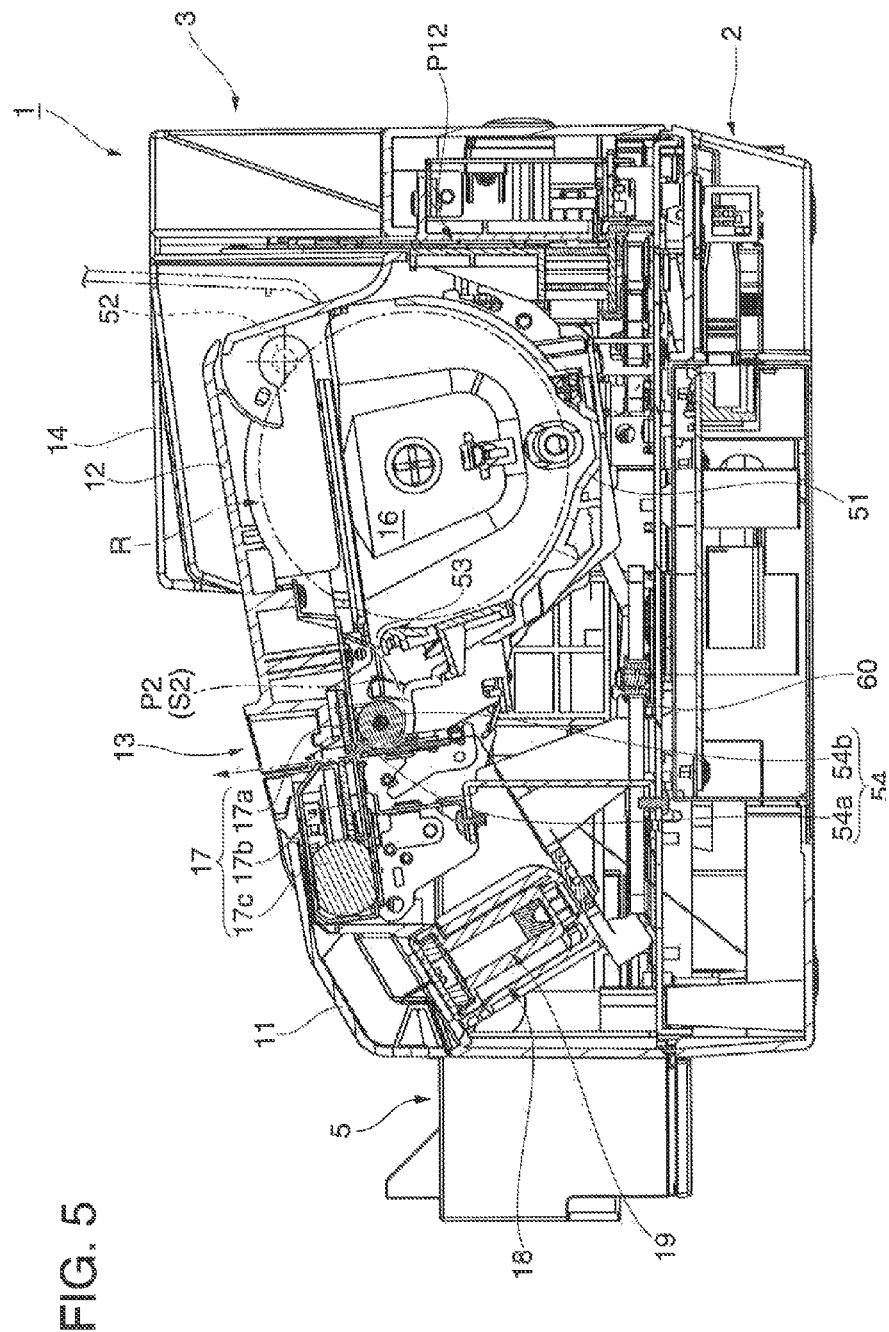
FIG. 5 is a vertical section view showing the receipt printing mechanism of the check processing device shown in FIG. 1.

FIG. 5 is a vertical section view of the check processing device 1. The receipt printing mechanism assembled in the inside case member 9 of the top case part 3 is described next primarily with reference to this figure. The receipt printing mechanism includes the roll paper compartment 16 that holds roll paper R as described above. The roll paper compartment 16 holds the roll paper R so that the roll can rotate freely about the transverse axis X. The continuous paper path P2 that guides the continuous paper S2 pulled from the roll paper R to the receipt exit 13 extends from the roll paper compartment 16 to the device front with the width of the paper path aligned with the device width.

The bottom of the roll paper compartment 16 is defined by a curved concave bottom panel 51, and the top opening is covered by the back cover 12. The back end of the back cover 12 is supported by a hinge 52 of which the center axis is the pivot axis extending transversely, and the back cover 12 opens and closes pivoting on this hinge 52.

The continuous paper S2 pulled from the roll paper R in the roll paper compartment 16 is guided to the front by a paper guide 53, which is attached to the front edge part of the bottom panel 51, to the continuous paper print unit 54. A guide roller that rotates freely to reduce the rolling resistance to the roll paper R may be disposed in the bottom of the roll paper compartment 16, and the roll paper R placed thereon.

The continuous paper print unit 54 includes a thermal line head 54a and a platen roller 54b that conveys while pressing the continuous paper S2 to the printhead surface of the thermal head 54a. In this embodiment the thermal line head 54a is disposed on the inside case member 9 side, and the platen roller 54b is mounted at a position on the distal end side of the back cover 12.

The automatic cutter 17 is disposed above the continuous paper print unit 54. The automatic cutter 17 includes a fixed knife 17a, and a drive unit 17c including a movable knife 17b. The fixed knife 17a is disposed on the back cover 12 side, and the movable knife 17b and drive unit 17c are disposed on the inside case member 9 side. The continuous paper S2 passes the cutting position of the automatic cutter 17 after passing the printing position of the continuous paper print unit 54, and is discharged to the top from the receipt exit 13 open above the automatic cutter 17.

Card Scanner Mechanism

The check processing device 1 has a card scanner mechanism for imaging cards C inserted from the card insertion path 15. Referring to FIG. 4, the card conveyance path of the card scanner mechanism includes the card insertion path 15, the downstream path P13 (common path), and the card path 100. A card sensor 57 that detects insertion of a card C is disposed in the card insertion path 15. The card sensor 57 could be a photocoupler or other optical sensor, or a mechanical switch, for example.

When insertion of a card C to the card insertion path 15 is detected by the card sensor 57, the conveyance roller pairs 35, 36 of the check conveyance mechanism disposed in the downstream path P13 turn, and a card in-feed operation that conveys the card C inserted from the card insertion path 15 from the downstream path P13 to the card path 100, and a card out-feed operation that conveys and returns the in-fed card C to the device front into the card insertion path 15, are performed. A card scanning operation that images the card C conveyed from the card path 100 through the downstream path P13 into the card insertion path 15 using the optical reader 43 used for check imaging is also performed.

Check Processing Device Control System and Operation

Operation of the check processing device 1 is controlled by a MPU or other control unit 61. As shown in FIG. 4, the control unit 61 is mounted on a circuit board 60 disposed on the top of the bottom case part 2. Maintenance is improved by updating a driver, for example, by using a single control unit 61 to control the check conveyance mechanism, receipt printing mechanism, and card scanning mechanism of the check processing device 1. Note that the control unit 61 may be provided as a control circuit board disposed on the back side of the circuit board 60 (the opposite side as the side on which the check path P1 is formed) instead of on the top of the circuit board 60 as shown in FIG. 4.

When a check S1 is inserted from the device front to the entry pocket 4, the control unit 61 controls driving the in-feed motor 22 of the check conveyance mechanism and feeds the check S1 into the check path P1 by means of the paper feed roller 30a. Synchronized to this, the control unit 61 controls driving the drive motor 40 and conveys checks S1 one by one through the upstream path P11 by means of the retard roller 31a and feed roller 31b.

As the check S1 is conveyed through the upstream path P11, the control unit 61 first controls the magnetic reading unit 41 to read the magnetic information from the check S1, and captures the magnetic information that was read. Next, the control unit 61 prints an endorsement on the back of the check S1 with the print unit 42. The control unit 61 then controls the optical reader 43 to image both sides of the check S1, and captures the scanned image information. The imaged check S1 is then discharged by the conveyance roller pair 36 into the exit pocket 5.

The user's workload can be reduced because reading magnetic information, printing an endorsement, and imaging can be done in a single continuous process with the check conveyance mechanism of the check processing device 1.

The control unit 61 also controls the in-feed motor 22 of the receipt printing mechanism to rotationally drive the platen roller 54b and convey the continuous paper S2 from the roll paper R through the continuous paper path P2. While the continuous paper S2 is conveyed between the thermal line head 54a and platen roller 54b, necessary information is printed on the continuous paper S2 as controlled by the control unit 61. The printed continuous paper S2 is then discharged to the outside from the receipt exit 13 by the platen roller 54b. When the printed leading end of the continuous paper S2 has been discharged and the trailing end of the printed portion reaches the cutting position of the automatic cutter 17, continuous paper S2 conveyance stops, the automatic cutter 17 is driven by the control unit 61 to cut widthwise, and the printed portion of the continuous paper S2 is cut off. The printed sheet that is cut to a specific length is then issued as a receipt.

When the control unit 61 detects, based on output from the card sensor 57, that a card C was inserted to the card insertion path 15, it controls driving the drive motor 40 of the check conveyance mechanism and drives the conveyance roller pairs 35, 36 for check conveyance to perform the card in-feed operation that conveys the card C inserted to the card insertion path 15 into the downstream path P13. The length of the card C in the conveyance direction is detected during the card in-feed operation based on the output from the card sensor 57.

The card in-feed operation stops when the trailing end in the in-feed direction of the card C has passed the reading position of the optical reader 43. The conveyance roller pairs 35, 36 are then driven in reverse, and the card out-feed operation that discharges the card C starts. The optical reader 43 is driven during the card out-feed operation to perform the scanning operation that images the front and back sides of the card C passing the scanning position. The card out-feed operation stops after the card C is fed a specific distance after the trailing end in the out-feed direction of the card C is detected by the card sensor 57. Images of the card C are thus captured.

During the check processing operation that conveys the check S1 through the check path P1, the path switching member 200 disposed to the junction M of the card path 100 and the back path P12 of the check path P1 is set to the first position, thereby connecting the back path P12 to the downstream path P13 and closing the gap between the card path 100 and downstream path P13. When a card C is inserted in the card insertion path 15 and the card C is scanned, the path switching member 200 is set to the second position, thereby connecting the card path 100 to the downstream path P13 and closing the gap between the back path P12 and the downstream path P13. In this embodiment the path switching member 200 is switched in conjunction with movement of a shutter 65 in the head maintenance mechanism 42b as described below. The configuration and operation of the head maintenance mechanism 42b of the check print unit 42 and the path switching member 200 are described below.

Head Maintenance Mechanism and Path Switching Member

Figure 6:
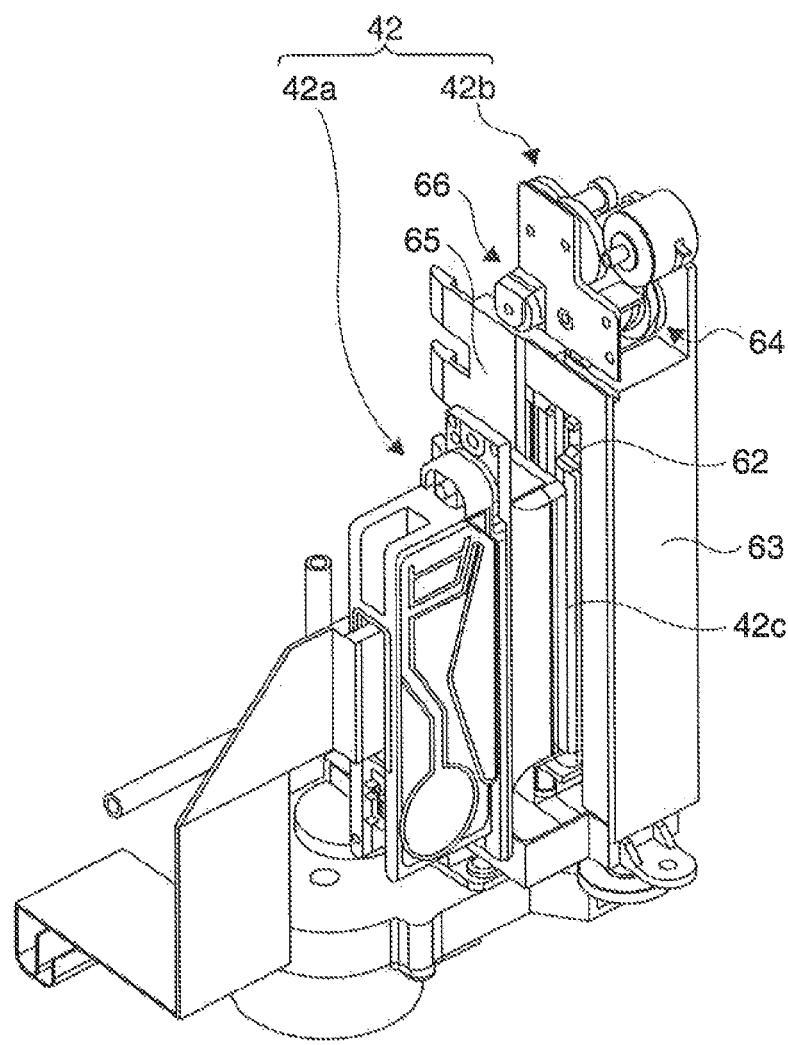
FIG. 6 shows the print unit of the check processing device shown in FIG. 1.

FIG. 6 shows the area around the inkjet head 42a and the head maintenance mechanism 42b of the check print unit 42. The head maintenance mechanism 42b of the check print unit 42 includes a nozzle cap 62 that caps the nozzle face 42c of the check print unit 42, a nozzle cap housing 63 that houses the nozzle cap 62, and a shutter 65 that caps the opening of the nozzle cap 62.

The nozzle cap 62 moves bidirectionally through an intervening uncapped position, by using a capping drive mechanism 64, between a retracted position inside the nozzle cap housing 63 and a capping position where the nozzle face 42c of the inkjet head 42a is covered to keep the nozzle face wet.

The shutter 65 moves bidirectionally using a shutter drive mechanism 66 between a closed position where the shutter 65 covers the opening to the nozzle cap housing 63 (the closed position closing the nozzle cap 62 opening), and an open position separated from the opening (an open position separated from the nozzle cap 62 opening). Movement of the nozzle cap 62 and shutter 65 by the capping drive mechanism 64 and shutter drive mechanism 66 is controlled by the control unit 61.

Figure 7:
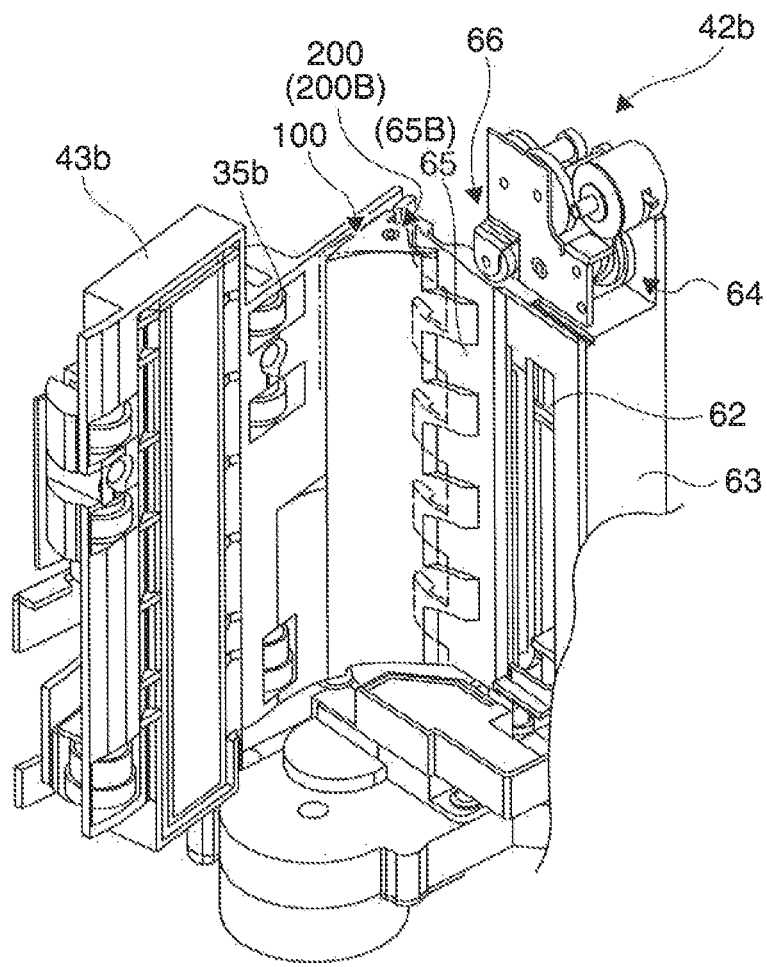
FIG. 7 shows the head maintenance mechanism when the shutter is in the open position.
Figure 8:
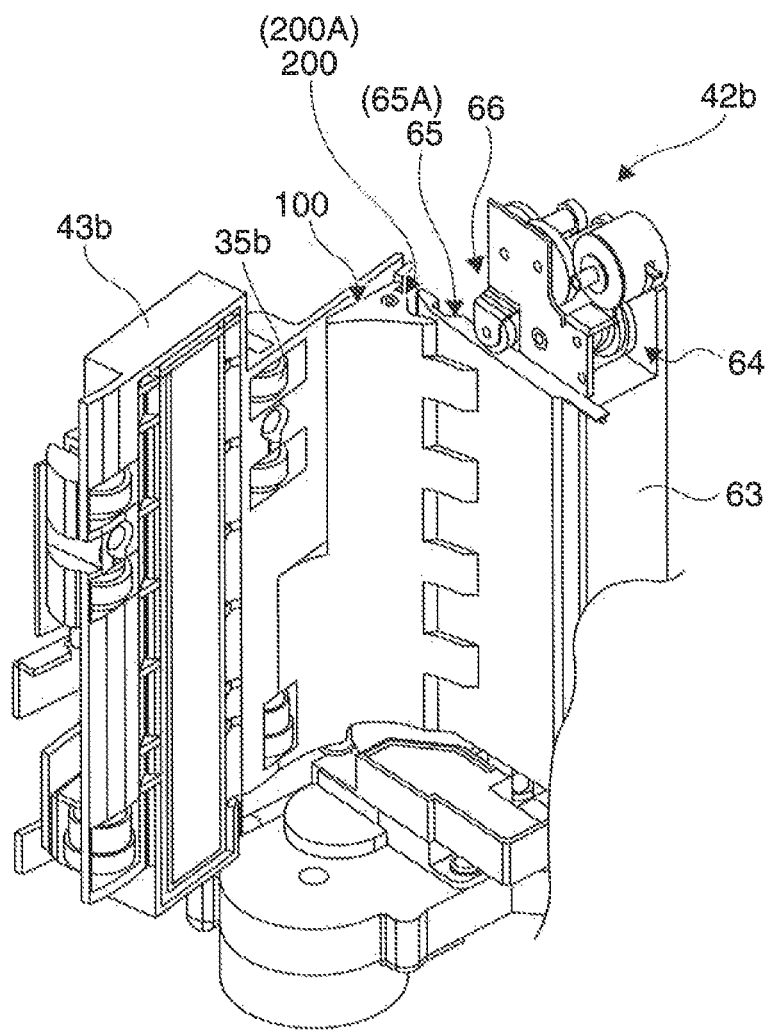
FIG. 8 shows the head maintenance mechanism when the shutter is in the closed position.
Figure 9:
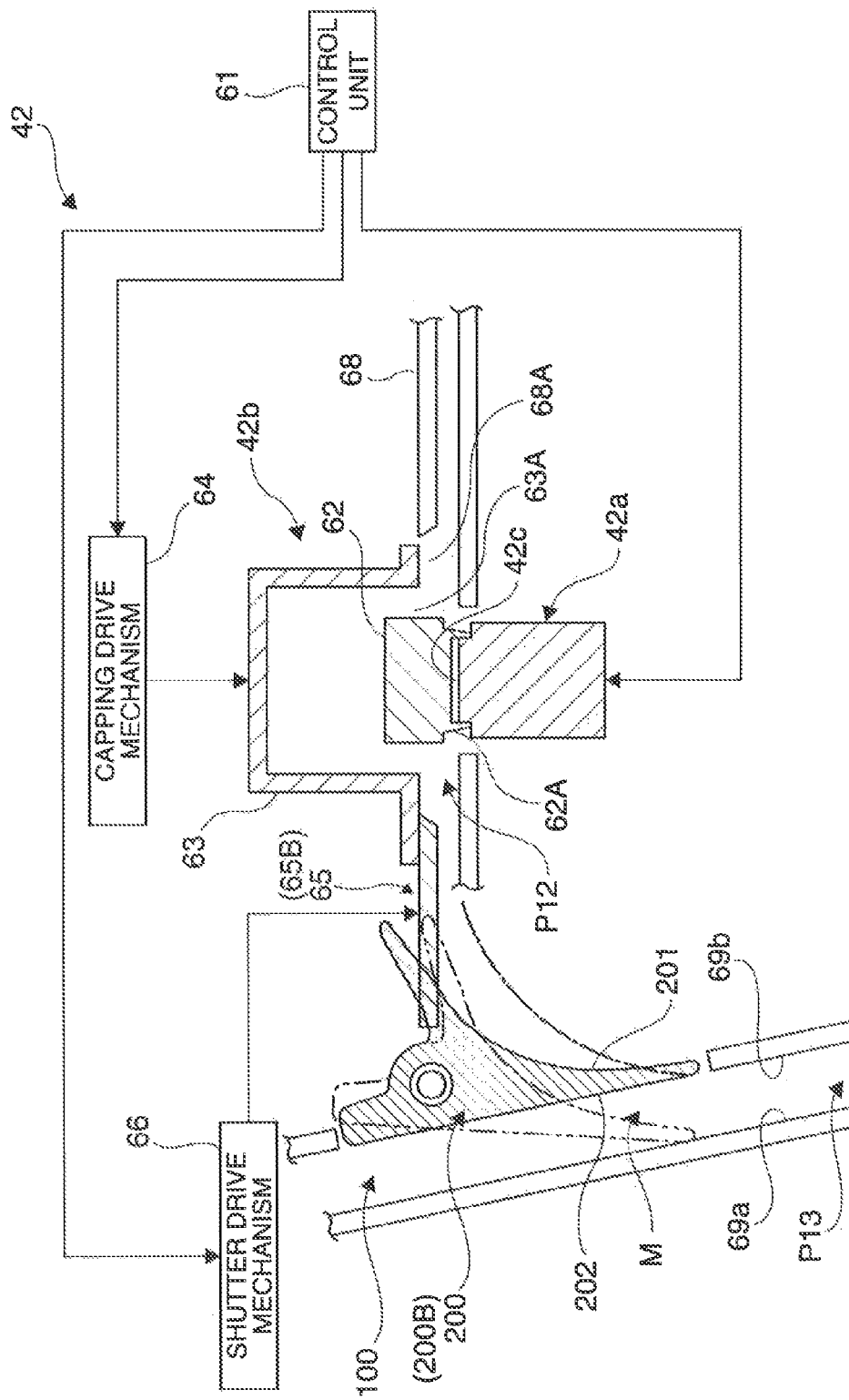
FIG. 9 shows the print unit when capped.
Figure 10:
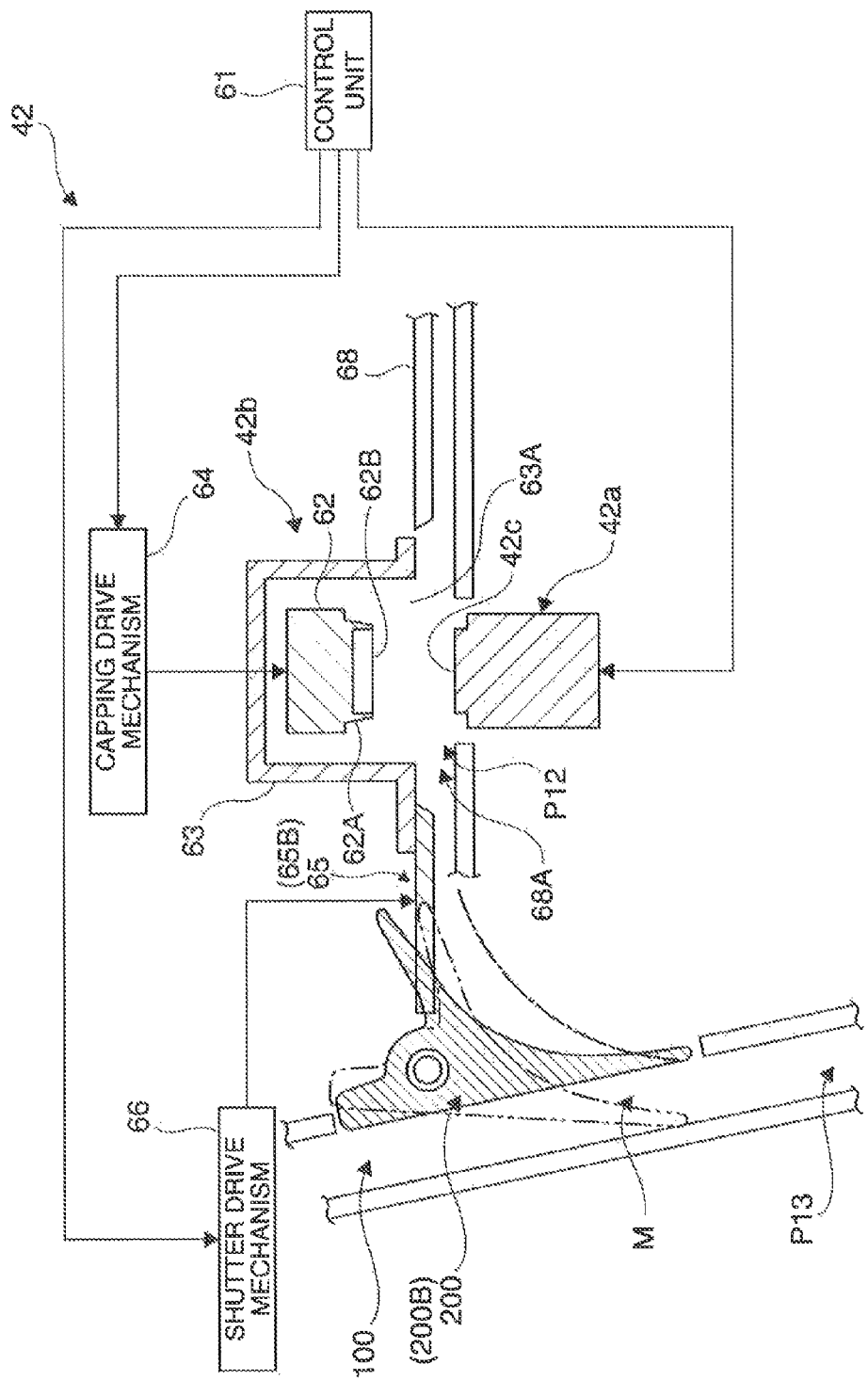
FIG. 10 shows the nozzle cap in the retracted position.
Figure 11:
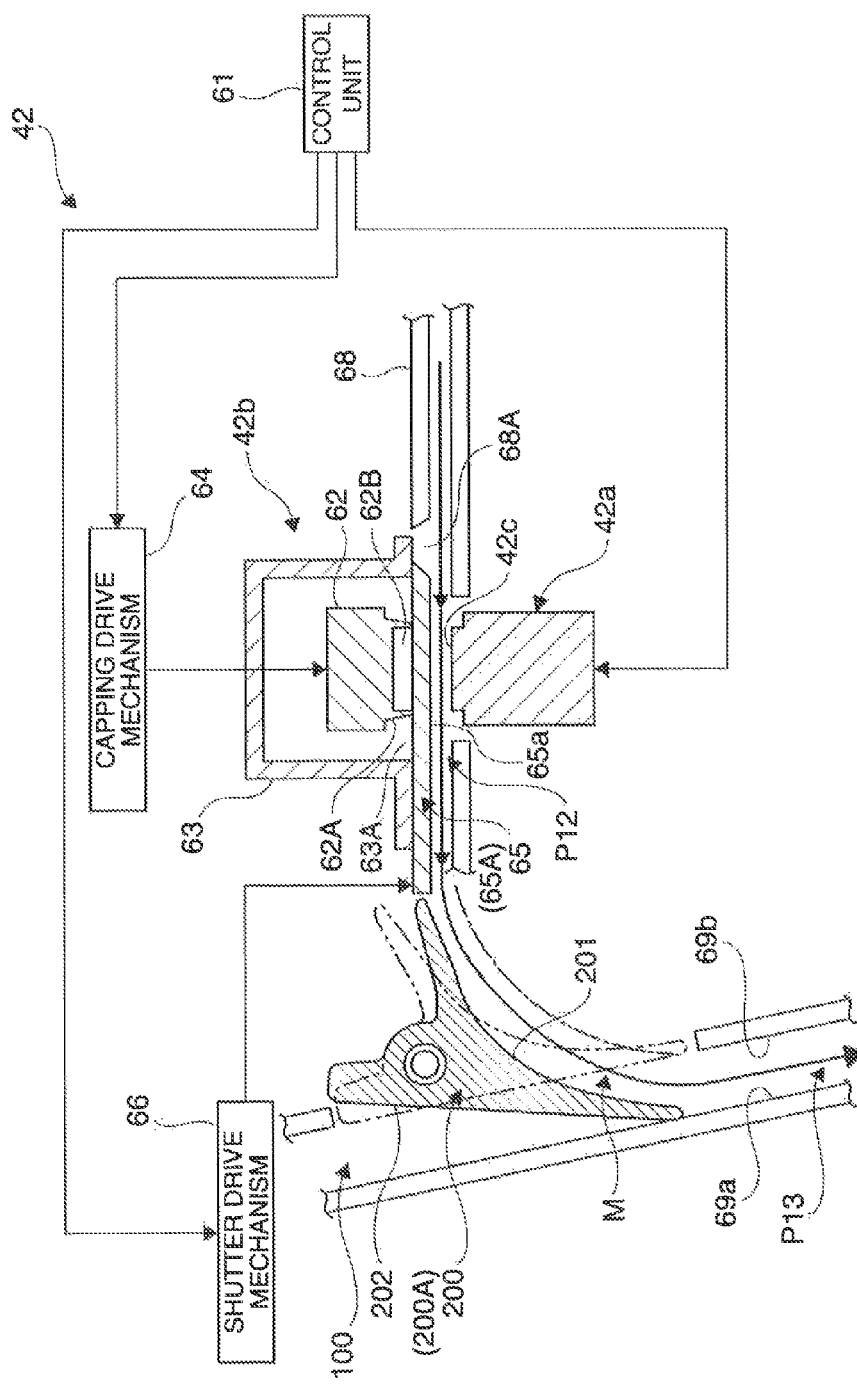
FIG. 11 shows the nozzle cap when capped by the shutter.

FIG. 7 shows the head maintenance mechanism 42b and path switching member 200 when the shutter 65 is in the open position 65B, and FIG. 8 shows the head maintenance mechanism 42b and path switching member 200 when the shutter 65 is in the closed position 65A. FIG. 9 shows when the nozzle face 42c of the inkjet head 42a is capped by the nozzle cap 62, and the path switching member 200 is in the second position 200B, and FIG. 10 shows when the nozzle cap 62 is in the retracted position. FIG. 11 shows when the nozzle cap 62 is closed and the path switching member 200 is switched to the first position 200A by the shutter 65 moving to the closed position 65A.

Described with reference to these figures, the inkjet head 42a is disposed with its nozzle face 42c facing the printing side of the check S1 conveyed through the back path P12 portion of the check path P1. The inkjet head 42a is an inkjet line head that prints on the printing surface of the check S1 by ejecting ink droplets onto the printing surface from plural nozzles formed in the nozzle face 42c based on input print data.

The nozzle cap 62 is disposed inside the nozzle cap housing 63 with the open part 62B thereof facing the nozzle face 42c of the inkjet head 42a.

The nozzle cap housing 63 has an open part 63A on the side toward the back path P12, and the nozzle cap 62 moves through this open part 63A toward the nozzle face 42c to cap the nozzle face 42c. More specifically, the nozzle cap 62 can move by the drive power of the capping drive mechanism 64 in the direction separating from the nozzle face 42c of the inkjet head 42a and the direction approaching the nozzle face 42c. The part of the open part 63A of the nozzle cap housing 63 opposite the nozzle face 42c of the inkjet head 42a at the back path P12 for check conveyance is a guide opening 68A, and the open part 63A of the nozzle cap housing 63 is located here. A guide member 68 that defines one guide surface of the back path P12 is positioned on the upstream side of the guide opening 68A, and the shutter 65 and path switching member 200 are located on the downstream side.

The nozzle cap 62 is in the capping position shown in FIG. 9 when the check processing device 1 power is off and until the printing operation of the print unit 42 starts after the power turns on. When in this position the nozzle face 42c of the inkjet head 42a is capped by the nozzle cap 62 and kept wet.

When the printing operation of the print unit 42 starts, the nozzle cap 62 retracts from the capping position to the retracted position shown in FIG. 10. The shutter 65 waiting in the open position 65B then moves to the position closing the guide opening 68A as shown in FIG. 11, that is, slides to the closed position 65A closing the open part 63A of the nozzle cap housing 63. The nozzle cap 62 then advances to the uncapped position in contact with the back of the shutter 65. As a result, the nozzle cap 62 is capped.

When the shutter 65 slides from the open position 65B to the closed position 65A, the path switching member 200 waiting at the second position 200B shown in FIG. 10 moves to the first position 200A shown in FIG. 11 in conjunction with this sliding action. As a result, the back path P12 communicates with the downstream path P13 and the check S1 conveyance path is formed. The shutter surface 65a of the shutter 65 opposite the nozzle face 42c of the inkjet head 42a thus functions as a check S1 platen surface (guide surface), the check guide surface 201 (first surface) of the path switching member 200 facing the back path P12 communicates smoothly with the shutter surface 65a of the shutter 65, and communicates smoothly with the guide surface 69a of the downstream path P13 on the same side.

When a specific time passes in the standby mode waiting for the next check S1 to be conveyed after the print unit 42 finishes printing one check S1, or when operation of the check processing device 1 stops because the power is turned off, the nozzle cap 62 moves to the capping position shown in FIG. 9 again, and caps the nozzle face 42c of the inkjet head 42a. The shutter 65 moves in this case from the closed position 65A to the open position 65B. When the shutter 65 moves, the path switching member 200 moves therewith from the first position 200A to the second position 200B, closing entry from the back path P12 to the downstream path P13 and opening the card path 100 to the downstream path P13, thus forming the card C scanning path and enabling scanning cards C. As will be understood from FIG. 9, the card guide surface 202 formed on the card path 100 side of the path switching member 200 communicates smoothly with the guide surface 69b on the same side of the downstream path P13.

Because the open part 62B of the nozzle cap 62 is thus covered by the shutter 65 while printing a check S1, the inside of the nozzle cap 62 is closed to the outside by the shutter 65. More specifically, the shutter 65 functions as a cap cover that closes the open part 62B of the nozzle cap 62 and keeps the inside thereof wet.

In addition, when the check S1 is being conveyed forward or reverse, the shutter 65 functions as a cover that when in the closed position 65A covers the guide opening 68A opposite the nozzle face 42c and covers the open part 63A of the nozzle cap housing 63. At the same time, the shutter surface 65a thereof also functions as a guide surface (platen surface) that determines the printing position of the check S1. Paper jams are therefore inhibited and smooth conveyance is possible.

Note that the shutter 65 can also move toward the nozzle cap 62, contact the open edge 62A of the nozzle cap 62, and thereby cover the nozzle cap 62.

Figure 12:
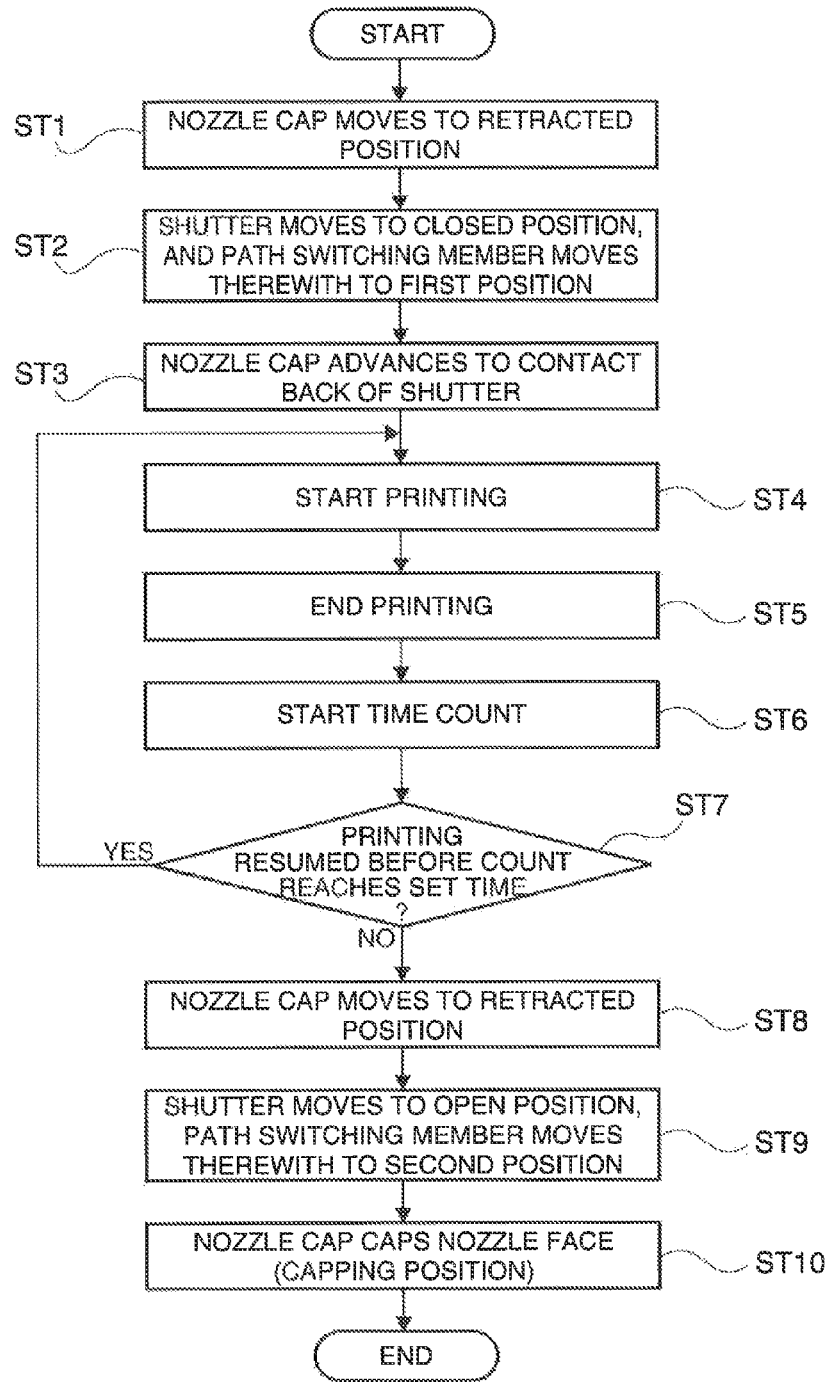
FIG. 12 is a flowchart of the operation of the nozzle cap, shutter, and path switching member.

FIG. 12 is a flow chart of the printing operation controlled by the control unit 61, focusing particularly on the operation of the nozzle cap 62 and shutter 65 of the head maintenance mechanism 42b, and the operation of the path switching member 200. Parts are positioned as shown in FIG. 9 before printing starts. When printing starts, the nozzle cap 62 is moved from the capping position shown in FIG. 9 to the retracted position shown in FIG. 10 by the capping drive mechanism (step ST1).

The shutter drive mechanism 66 then slides the shutter 65 from the open position 65B shown in FIG. 10 to the closed position 65A shown in FIG. 11 (step ST2). As the shutter 65 slides, the path switching member 200 also moves from the second position 200B to the first position 200A shown in FIG. 11. As a result, the back path P12 communicates with the downstream path P13, and the check conveyance path is formed. The capping drive mechanism 64 then moves the nozzle cap 62 from the retracted position to the position in contact with the back of the shutter 65 (step ST3). Printing a check S1 then starts (step ST4).

When printing a check 51 ends (step ST5), the control unit 61 starts counting the time from when printing ended (step ST6). If printing starts again before the count reaches a preset time (step ST7 returns Yes), the count is reset and printing a check 51 starts again (step ST4).

When the count reaches the preset time (step ST7 returns No), the nozzle cap 62 is moved by the capping drive mechanism 64 from the position touching the back of the shutter 65 (FIG. 11) to the retracted position (FIG. 10) (step ST8), and the shutter drive mechanism 66 slides the shutter 65 from the closed position 65A (FIG. 11) to the open position 65B (FIG. 10) (step ST9). Following the shutter 65, the path switching member 200 also switches from the first position 200A (FIG. 11) to the second position 200B (FIG. 10). As a result, the back path P12 is isolated from the receipt exit 13, the card path 100 is opened to the downstream path P13, and the card C conveyance path is formed. The nozzle face 42c is then capped by the nozzle cap 62 by the capping drive mechanism 64 advancing the nozzle cap 62 from the retracted position to the capping position (step ST10).

Example of a Capping Drive Mechanism and a Shutter Drive Mechanism

Figure 13:
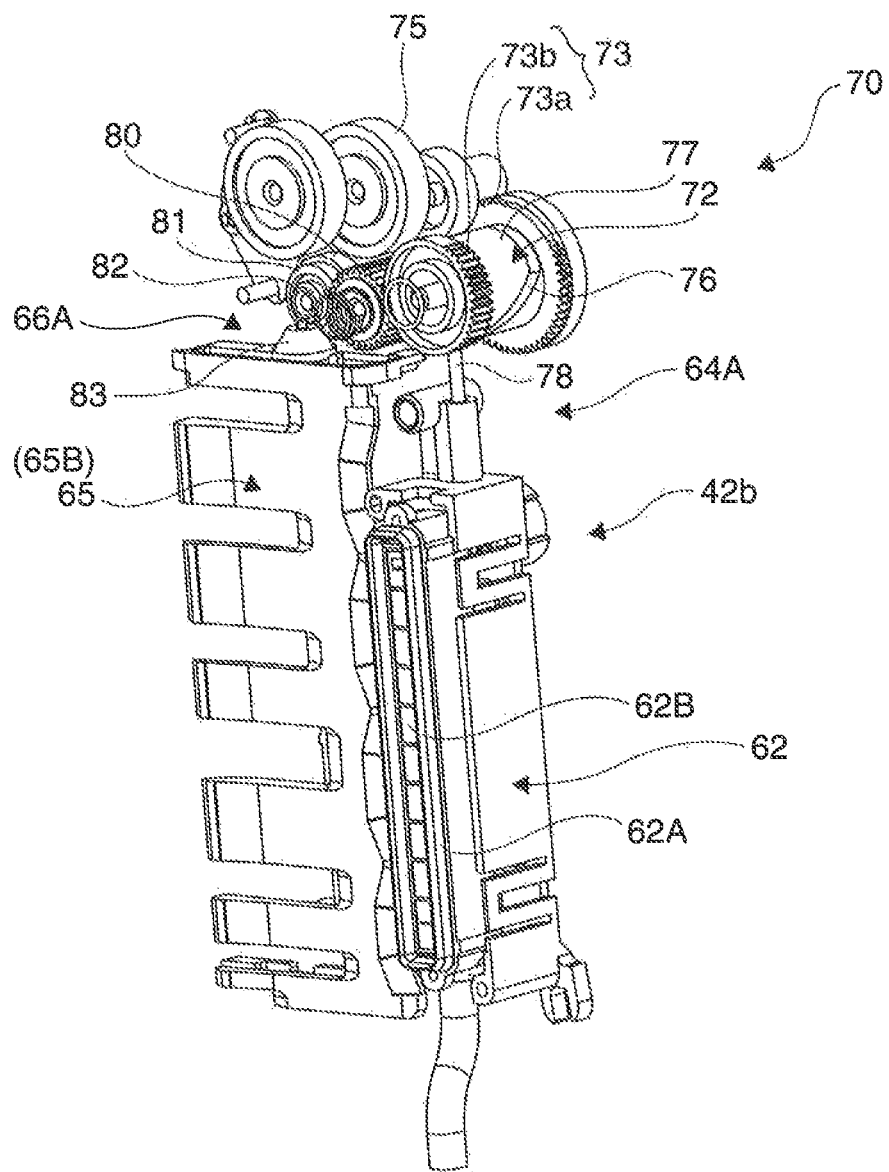
FIG. 13 shows the configuration of the capping drive mechanism and the shutter drive mechanism.
Figure 14:
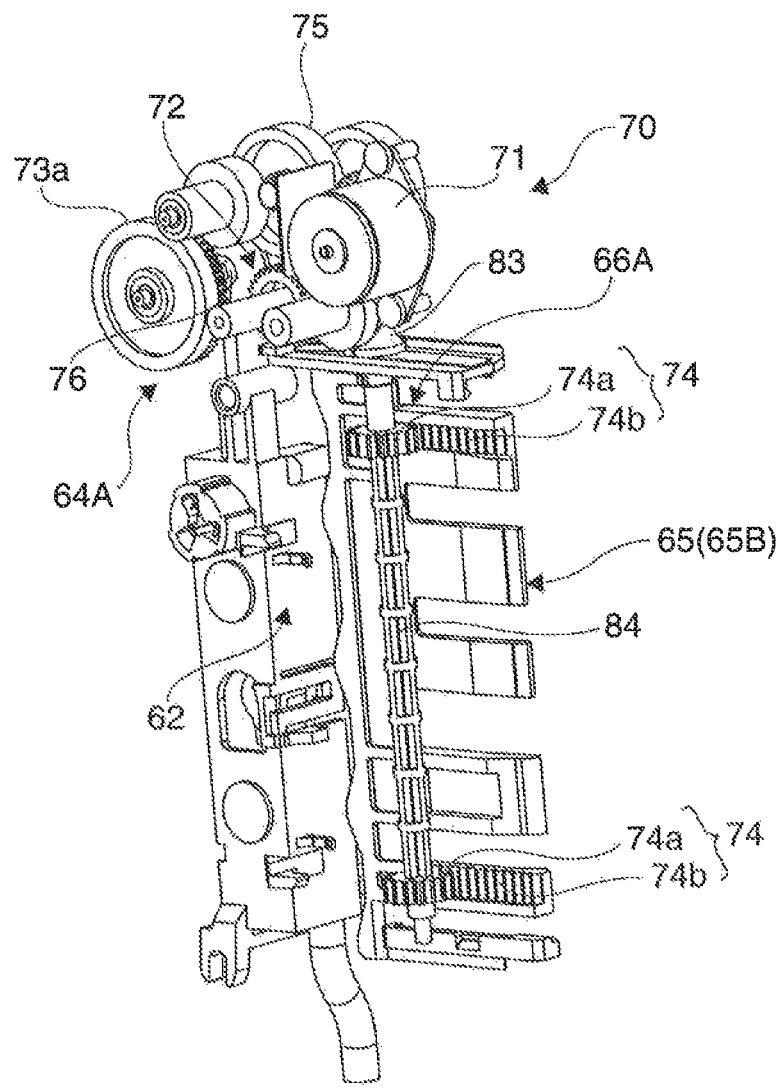
FIG. 14 shows the mechanism shown in FIG. 13 from the back side.

FIG. 13 shows an example of a drive control mechanism that drives the nozzle cap 62 and shutter 65, and shows the nozzle cap 62 in the capping position and the shutter 65 in the open position. FIG. 14 shows the drive control mechanism shown in FIG. 13 from the opposite side of the back path P12, which is the check conveyance path. The drive control mechanism 70 includes a capping drive mechanism 64A and a shutter drive mechanism 66A.

The capping drive mechanism 64A includes a drive motor 71 (capping motor) and a cylindrical cam 72 that converts the output rotation of the drive motor 71 to the linear bidirectional motion of the nozzle cap 62 between the retracted position and capping position.

The shutter drive mechanism 66A includes an intermittent gear 73 and a rack and pinion 74 that convert rotation of the cylindrical cam 72 to the linear bidirectional movement of the shutter 65 between the closed position and the open position.

As controlled by the control unit 61, the drive control mechanism 70 performs the nozzle capping operation of the nozzle cap 62, the operation whereby the shutter 65 covers the open part 63A of the nozzle cap housing 63, and the operation whereby the shutter 65 covers the nozzle cap.

First, the shutter 65 is held in the open position when the nozzle cap 62 is in the capping position, and when the nozzle cap 62 moves from the capping position to the retracted position. When the nozzle cap 62 returns to the retracted position, the shutter 65 moves from the open position to the closed position, and covers the open part 63A of the nozzle cap housing 63. When the shutter 65 is in the closed position, the nozzle cap 62 is advanced to the position touching the back of the shutter 65 so that the nozzle cap 62 is covered.

More specifically, the capping drive mechanism 64A has a speed reducing gear train 75 that slows and transfers the output rotation of the drive motor 71 (capping motor) to the cylindrical cam 72. The cylindrical cam 72 has a cylindrical part 77 that is disposed horizontally and has a cam groove 76 formed around the circumference thereof, a large intermittent gear 73a formed coaxially in unison with one end of the cylindrical part 77, and a small intermittent gear 73b formed coaxially in unison the other end of the cylindrical part 77. The intermittent gears 73a, 73b are gears having a toothless portion where external teeth are not formed in a specific angular range.

A vertical pin 78 is slidably inserted to the cam groove 76 of the cylindrical cam 72 as a cam follower that protrudes vertically from below. The vertical pin 78 is formed in unison with the top of the nozzle cap 62, and the nozzle cap 62 is supported so that it can move in a reciprocating motion linearly to the center axis of the cylindrical cam 72 by the nozzle cap housing 63 not shown. When the cylindrical cam 72 turns, the vertical pin 78 inserted to the cam groove 76 moves in the direction of the center axis of the cylindrical cam 72, and the nozzle cap 62 to which the vertical pin 78 is attached moves in the same direction. The cam groove 76 of the cylindrical cam 72 is formed so that the nozzle cap 62 moves between the retracted position inside the nozzle cap housing 63 and the capping position.

The shutter drive mechanism 66A has a transfer gear train 80 that meshes with the small intermittent gear 73b of the cylindrical cam 72. A drive-side bevel gear 82 is coaxially attached to the last gear 81 of the transfer gear train 80, and a follower-side bevel gear 83 that rotates on a vertical axis meshes with the drive-side bevel gear 82. The follower-side bevel gear 83 is attached to the top end of a vertical shaft 84, which extends vertically along the back of the shutter 65. A pair of pinions 74a are attached coaxially to positions at the top and bottom ends of the vertical shaft 84. These pinions 74a mesh with a pair of racks 74b formed on the back of the shutter 65.

When the cylindrical cam 72 turns and the nozzle cap 62 moves, the pinions 74a rotate in a specific direction synchronized thereto, the racks 74b meshed with the pinions 74a move in a reciprocal linear action in the direction of the back path P12 of check conveyance, and the shutter 65 on which the racks 74b are formed moves linearly bidirectionally between the closed position covering the open part 63A of the nozzle cap housing 63 and the open position.

Figure 15:
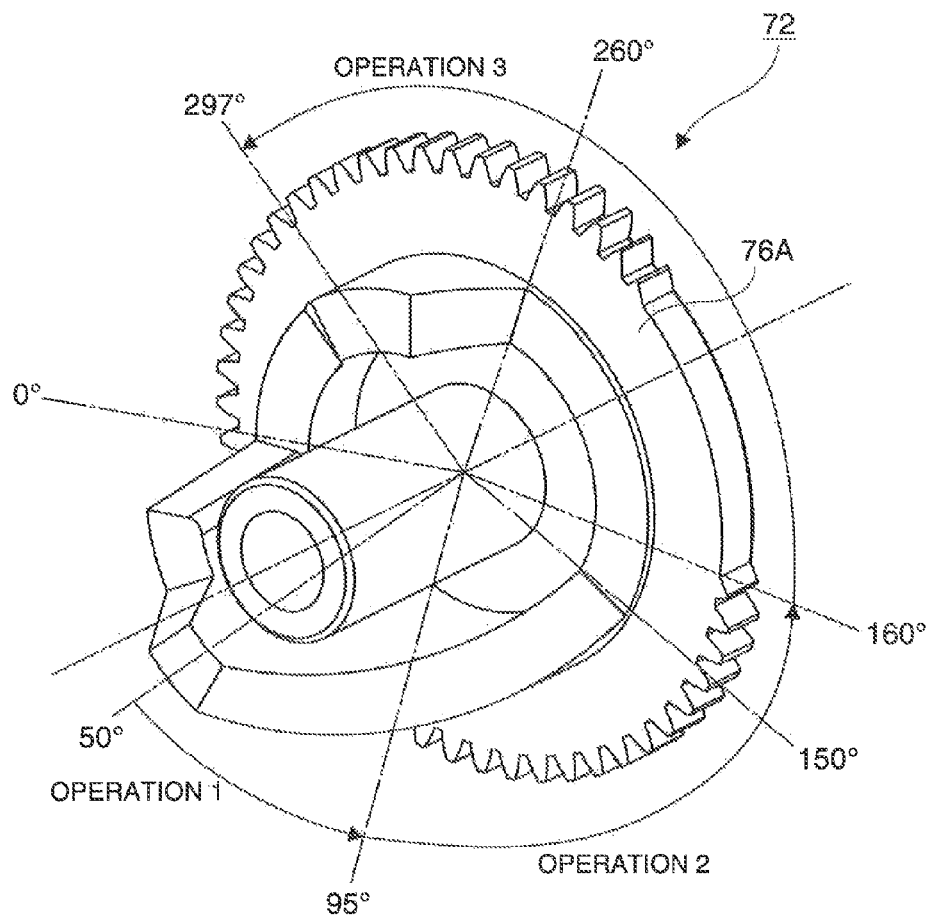
FIG. 15 describes the cam profile of the cam groove of the cylindrical cam.
Figure 16:
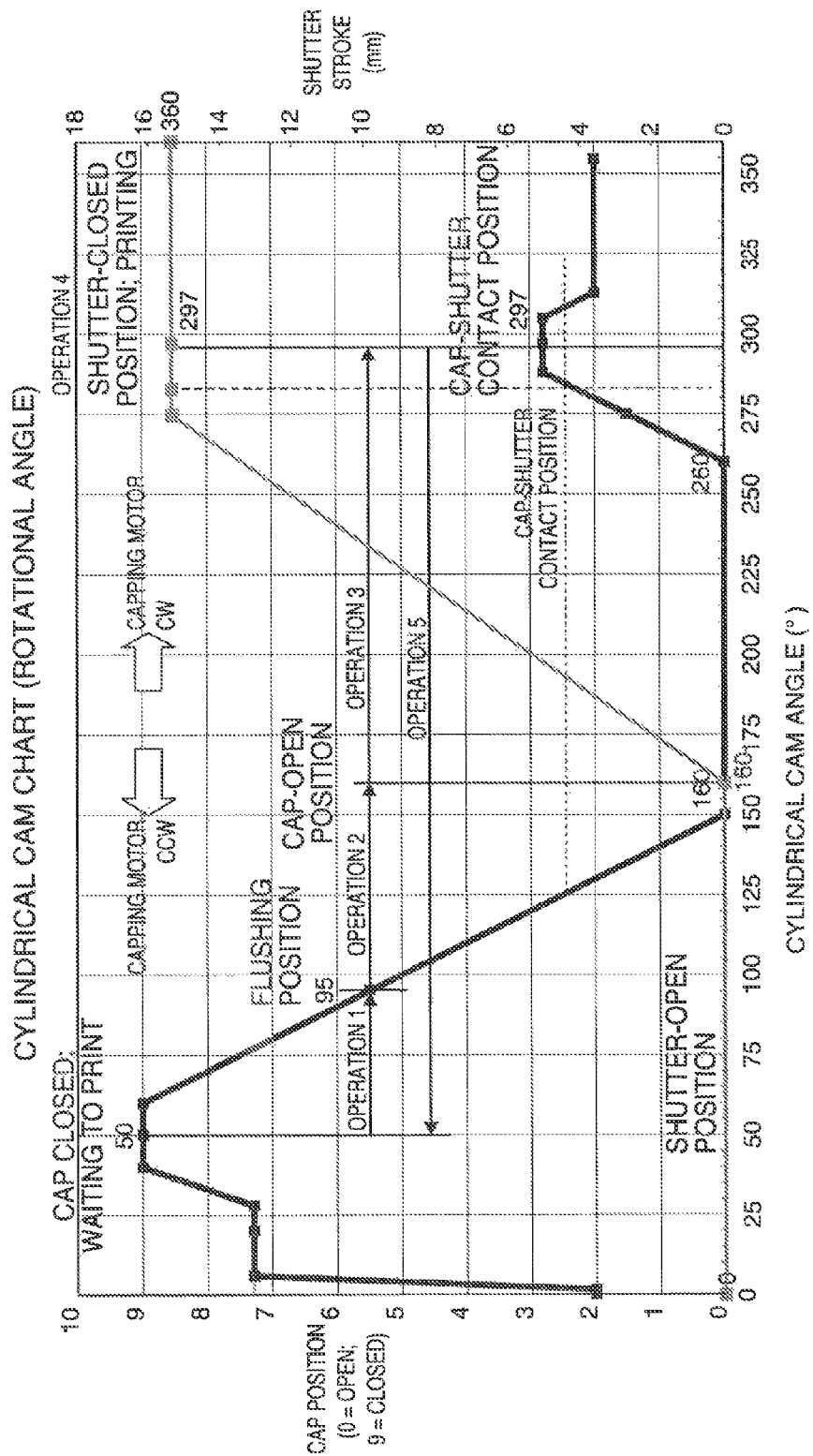
FIG. 16 is a cylindrical cam chart showing the movement of different parts in conjunction with rotation of the cylindrical cam.

FIG. 15 is an oblique view of the cam face 76A of the cam groove 76 of the cylindrical cam 72, and FIG. 16 is a cylindrical cam chart showing the position of the nozzle cap 62 (capping position) relative to the rotational angle of the cylindrical cam 72, and the position of the shutter 65 (shutter stroke). The positions of the nozzle cap 62 and shutter 65 are determined by the phase (rotational angle) of the cylindrical cam 72 in the drive control mechanism 70 according to this embodiment of the invention. Also in this embodiment, the position when the cylindrical cam 72 rotates 50° clockwise from the origin (0° rotational angle) is the standby position, and the position at 297° is the printing position.

In the stand by position, the nozzle cap 62 is in the capping position covering the nozzle face 42c of the inkjet head 42a, and the shutter 65 is in the open position. In the printing position, the shutter 65 is in the closed position, and the nozzle cap 62 is in the covered position against the back of the shutter 65. Note that in FIG. 16 the position of the nozzle cap 62 is shown as 0=OPEN in the retracted position and 9=CLOSED in the capping position. The position of the shutter 65 is also indicated by the stroke (mm) from the open position to the closed position, the open position is indicated as the shutter-open position with a stroke of 0, and the closed position is indicated as the shutter-closed position.

Figure 17:
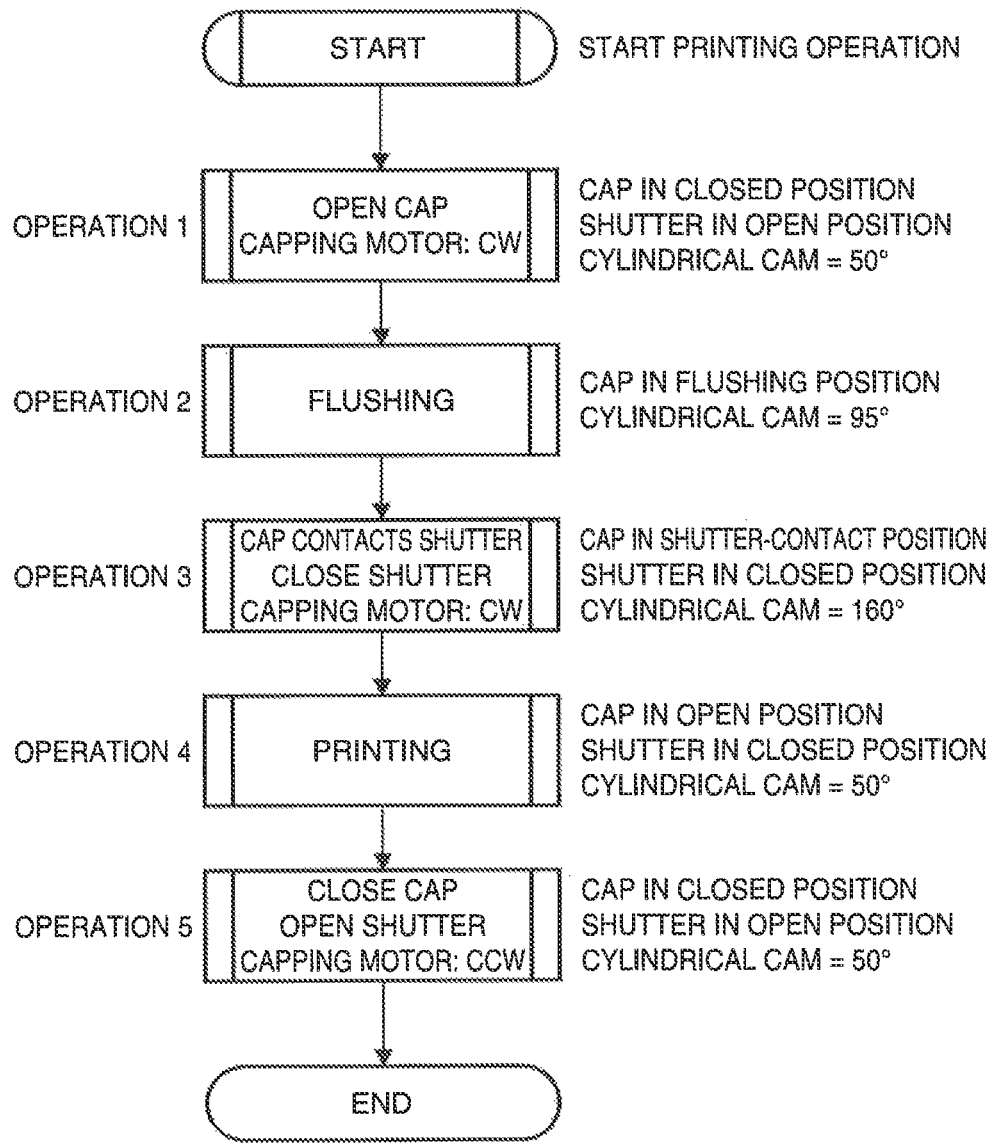
FIG. 17 is a flow chart that shows the operation of parts accompanying rotation of the cylindrical cam after printing starts.
Figure 18:
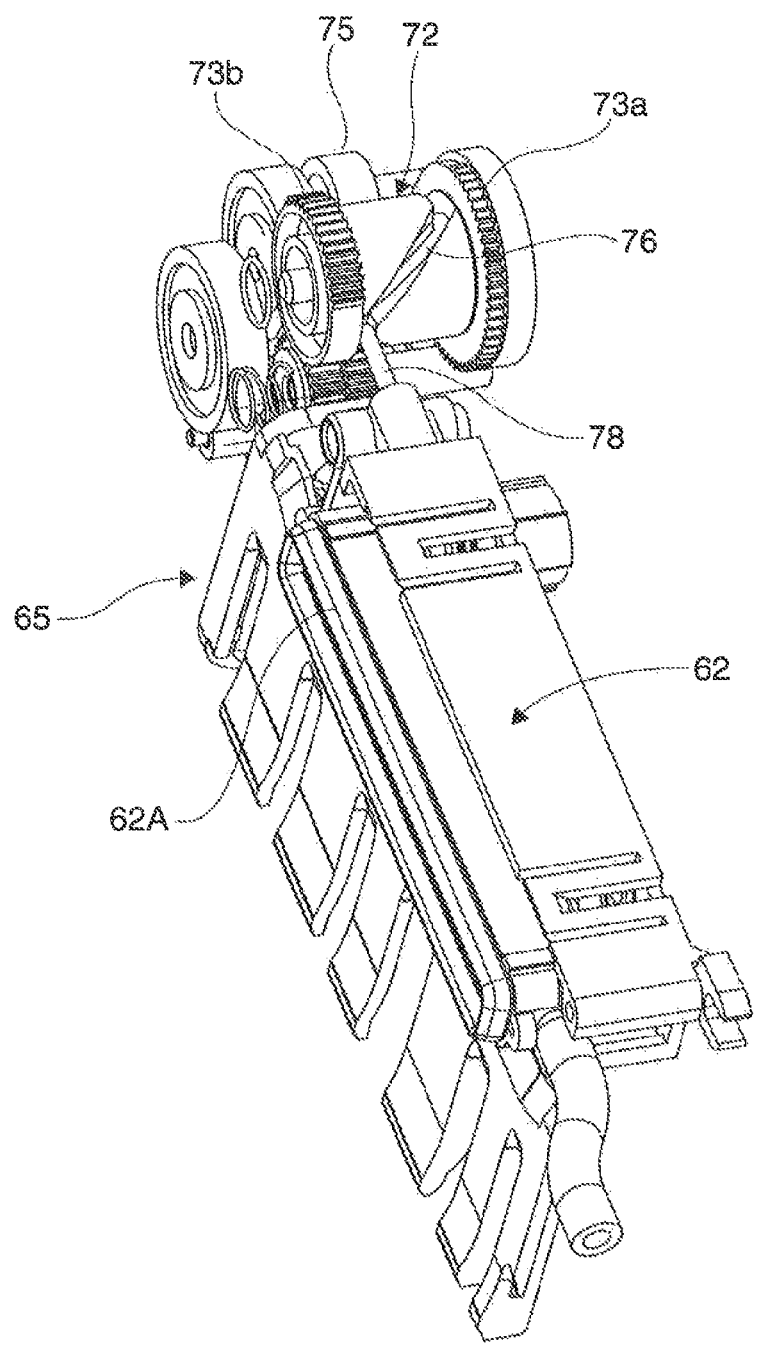
FIG. 18 shows when the cylindrical cam has rotated to the 50° position.
Figure 19:
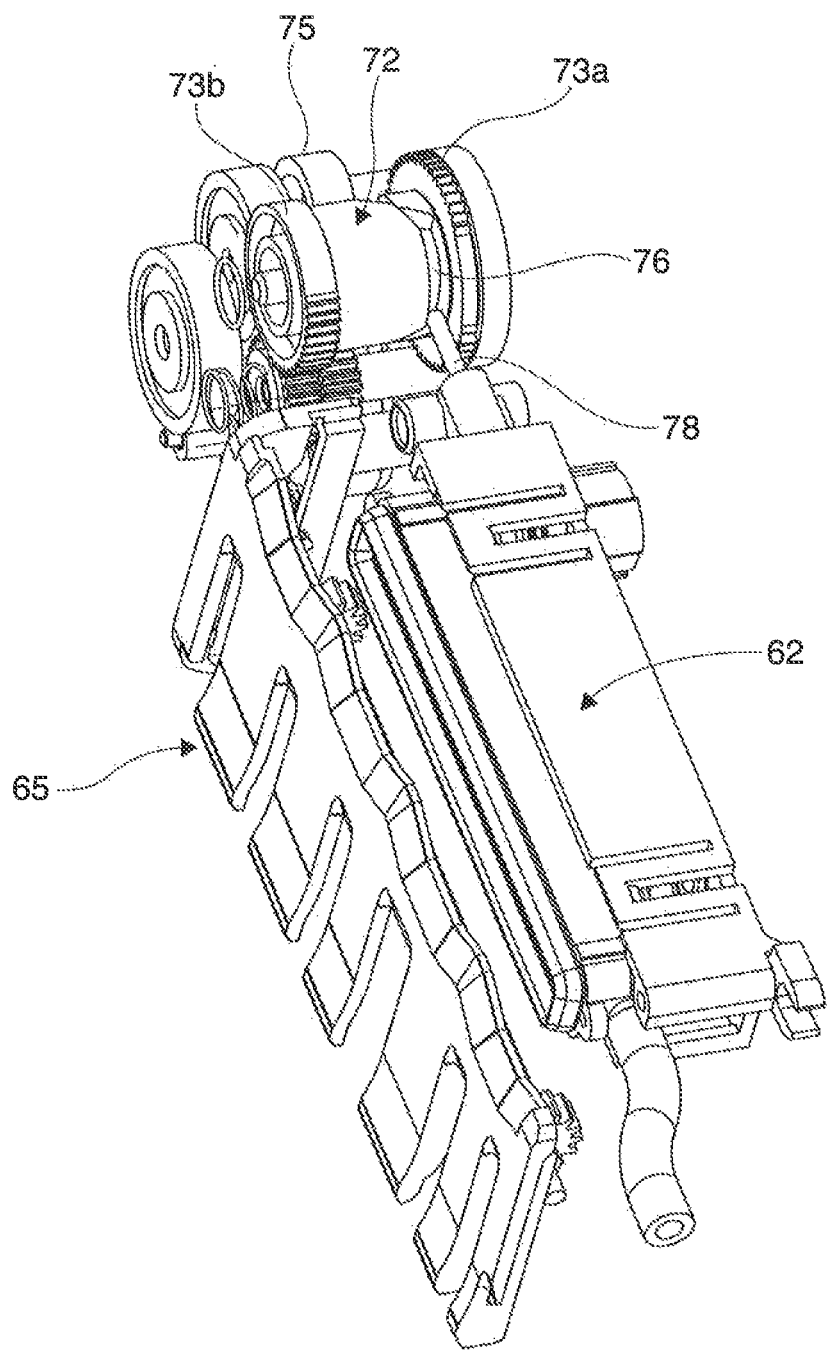
FIG. 19 shows when the cylindrical cam has rotated to the 160° position.
Figure 20:
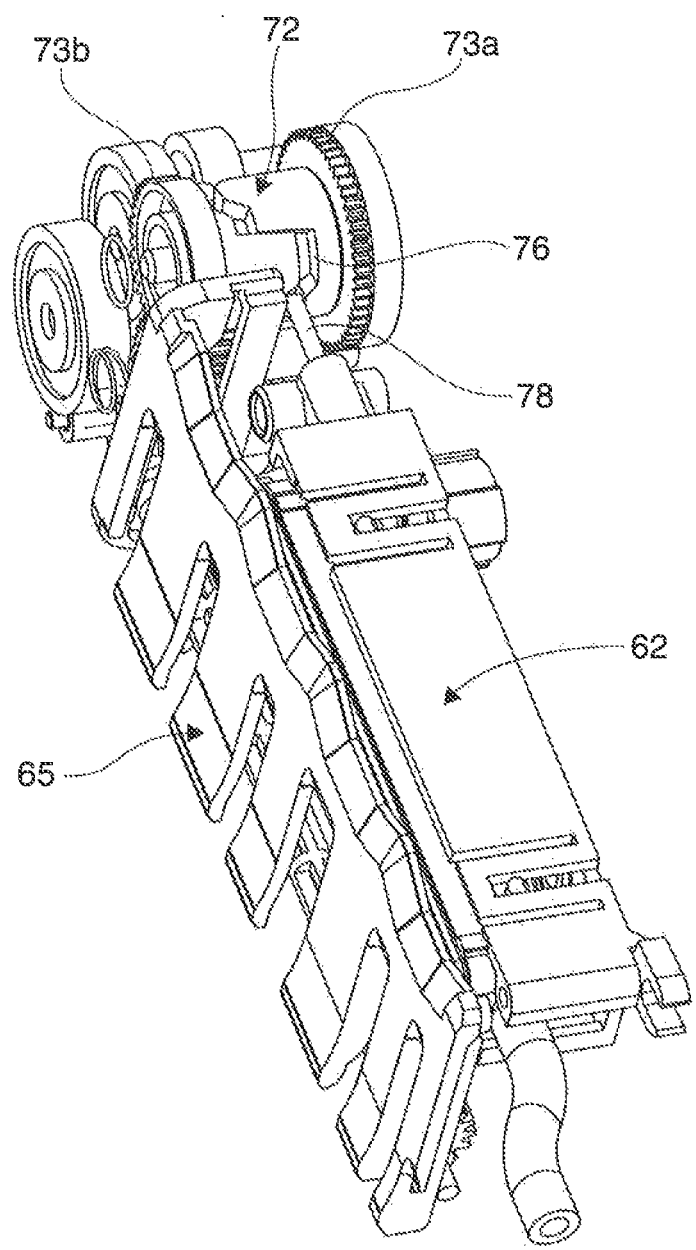
FIG. 20 shows when the cylindrical cam has rotated to the 297° position.

FIG. 17 is a flow chart showing the operation of parts after printing starts. FIG. 18 shows the cylindrical cam 72 when at the 50° position, FIG. 19 shows the cylindrical cam 72 at the 160° position, and FIG. 20 shows the cylindrical cam 72 at the 297° position.

The operation of the different parts is described next with reference to the flow chart in FIG. 17. In the standby state before printing starts, the cylindrical cam 72 is at the standby position at 50° shown in FIG. 18, the nozzle face 42c of the inkjet head 42a is capped by the nozzle cap 62 (closed cap position), and the shutter 65 is in the open position (open shutter position).

Operation 1 starts when a start command for the printing operation is received, such as when the control unit 61 (FIG. 9 to FIG. 11) receives a start printing command from the host computer. As will be understood from FIG. 16, in operation 1 the drive motor 71 is driven to rotate clockwise, the cylindrical cam 72 turns from 50° to 95°, and during this rotation the nozzle cap 62 retreats a specific distance from the capping position to the retracted position, and the shutter 65 is held in the open position (open shutter position).

Operation 2 starts when the cylindrical cam 72 rotates to the 95° position, and flushing occurs while the cylindrical cam 72 rotates to the 160° position. Flushing is an operation that ejects ink droplets from nozzles of the inkjet head 42a into the nozzle cap 62 in order to expel ink that has increased in viscosity inside the nozzles, and thereby restores nozzles that are not ejecting properly to normal operation. When the cylindrical cam 72 reaches the 160° position, the nozzle cap 62 is at the retracted position (the open cap position shown in FIG. 19).

Operation 3 starts after the cylindrical cam 72 rotates to the 160° position. In operation 3, the cylindrical cam 72 rotates from the 160° position to the 297° position. During operation 3, the nozzle cap 62 is held in the retracted position, and the shutter 65 slides from the open position to the closed position, reaching the closed position completely closing the open part 63A of the nozzle cap housing 63 when the cylindrical cam 72 rotates to 275°. In addition, starting from when the cylindrical cam 72 passes the 260° position, the nozzle cap 62 advances from the retracted position until the nozzle cap 62 is covered in contact with the back of the shutter 65 in the closed position (the cap contact position shown in FIG. 20).

Operation 4 starts after the cylindrical cam. 72 reaches the 297° position. More specifically, the printing operation is executed and an endorsement is printed by the inkjet head 42a on the back of the check S1 passing the printing position.

Operation 5 starts after printing ends. In operation 5 the drive motor 71 (capping motor) turns counterclockwise (CCW) and the cylindrical cam 72 rotates back to the standby position at 50°. As a result, the nozzle cap 62 retracts toward the retracted position from the position contacting the back of the shutter 65. Next, the shutter 65 starts sliding from the closed position to the open position. After the shutter 65 slides to the open position, the nozzle cap 62 advances from the retracted position past the open part 63A of the nozzle cap housing 63 to the capping position, and returns to the position capping the nozzle face 42c of the inkjet head 42a shown in FIG. 18.

The drive control mechanism 70 according to this embodiment of the invention can thus rotate both the intermittent gear 73 and cylindrical cam 72, and operate the nozzle cap 62 and shutter 65 synchronously, using a single drive motor 71 (capping motor). As a result, the capping drive mechanism 64 and shutter drive mechanism 66 can be constructed compactly.

Shutter 65 and Path Switching Member 200 Linking Mechanism

Figure 21:
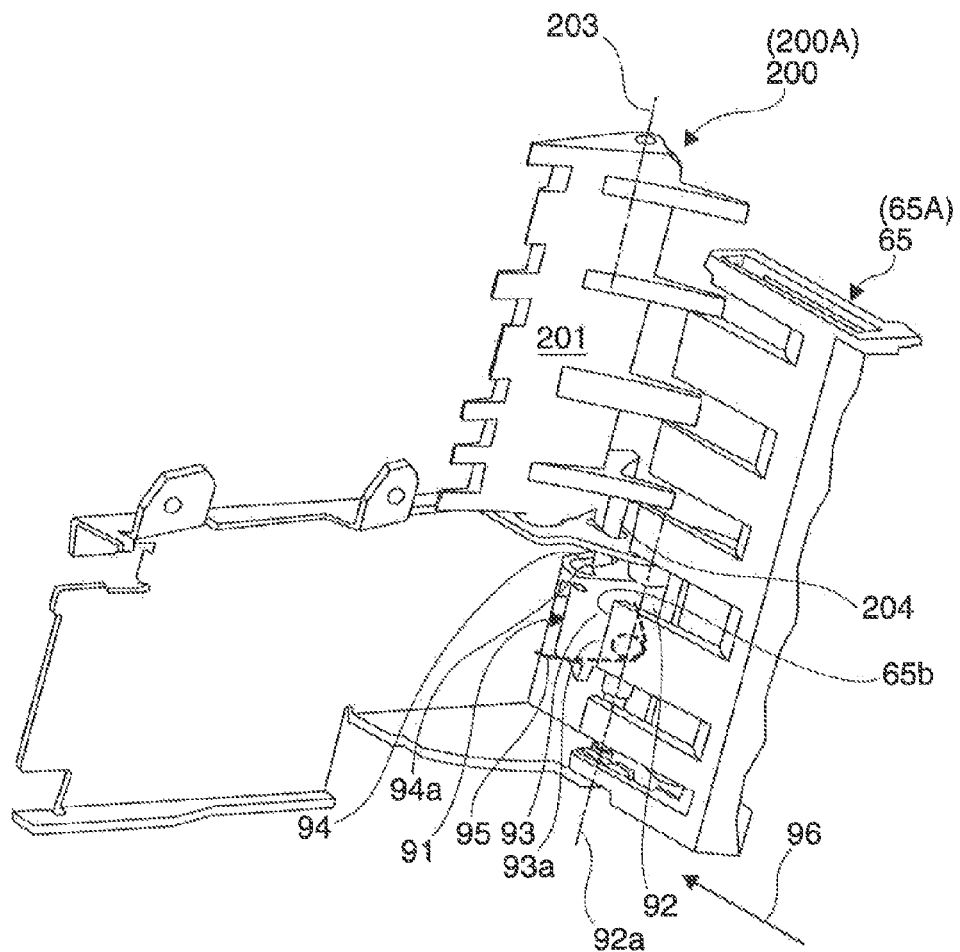
FIG. 21 shows an example of a linkage mechanism that causes the path switching member to follow the shutter.

FIG. 21 shows an example of a linking mechanism that switches the path switching member 200 to the first position 200A and second position 200B in conjunction with the sliding action of the shutter 65. Various configurations can be used as a linking mechanism that changes the position of the path switching member 200 linked to the movement of the shutter 65, and the invention is not limited to the following.

In the example shown in FIG. 21, the path switching member 200 is plastic, pivots on a predetermined pivot axis 203, and switches between the first position 200A and second position 200B. A cam pin 204 extending parallel to the pivot axis 203 is formed at a position on the path switching member 200 separated radially from the pivot axis 203.

A pivot member 91 is disposed between the path switching member 200 and the shutter 65. A pivot shaft 92 extending parallel to the pivot axis 203 is formed on the pivot member 91, and the pivot member 91 can pivot on this pivot shaft 92. A pivot arm 93 that protrudes radially is formed in unison with the pivot shaft 92, and a cam groove 94 is formed in the surface of the pivot arm 93 facing the direction of the pivot axis 92a (the top as seen in the figure). The distal end of the cam pin 204 formed on the path switching member 200 side is inserted slidably in the cam groove 94.

A torsion spring 95 is attached to the pivot shaft 92 of the pivot member 91, and the spring force of this torsion spring 95 holds the side 93a of the pivot arm 93 of the pivot member 91 in constant contact with the shutter 65. More specifically, the side 93a of the pivot arm 93 of the pivot member 91 is constantly pushed to the shutter 65 by a spring force pushing from the open position 65B to the closed position 65A.

When the shutter 65 slides from the closed position shown in FIG. 21 to the open position indicated by arrow 96, the distal end 65b in the sliding direction of the shutter 65 causes the pivot member 91 to rotate in the same direction against the spring force. When the pivot member 91 turns, the cam pin 204 is pushed by the cam face 94a formed on the inside surface of the cam groove 94, and the cam pin 204 moves along the cam face 94a. As a result, the path switching member 200 to which the cam pin 204 is formed in unison rotates on the pivot axis 203 from the first position 200A shown in FIG. 21 to the second position 200B. When the shutter 65 moves to the open position 65B, the path switching member 200 is set to the second position 200B.

Next, the pivot member 91 is pushed to the shutter 65 by the spring force of the torsion spring 95. The pivot member 91 is connected to the path switching member 200 through the cam mechanism including the cam pin 204 and cam groove 94. Therefore, when the shutter 65 slides from the open position 65B to the closed position shown in FIG. 21, the pivot member 91 follows and rotates in the sliding direction due to the spring force. As a result, the cam pin 204 of the path switching member 200 is pushed by the cam face 94a of the pivot member 91, and the path switching member 200 rotates from the second position 200B to the first position 200A shown in FIG. 21 and switches to the first position 200A.

The invention being thus described, it will be apparent that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
a first path that conveys a first medium;
a second path that conveys a second medium;
a common path that conveys both the first medium and second medium from a junction between the first path and second path;
a scanner that images the first medium or second medium passing through the common path;
an inkjet head that prints on the first medium passing through the first path;
a nozzle cap that can move to a capping position covering a nozzle face of the inkjet head and keeping the nozzle face wet, and an uncapped position separated from the nozzle face;
a shutter that can move to a closed position closing an open part of the nozzle cap at the uncapped position and keeping an inside of the nozzle cap wet, and an open position separated from the open part; and
a path switching member that can switch at the junction between a first position connecting the first path to the common path, and a second position connecting the second path to the common path,
the path switching member switching from the first position to the second position in conjunction with the shutter moving from the closed position to the open position, and switching from the second position to the first position in conjunction with the shutter moving from the open position to the closed position.

2. The media processing device described in claim 1, wherein:
the nozzle cap can move between the uncapped position opposite the nozzle face of the inkjet head with the first path therebetween, and the capping position, wherein the capping position is at a position located advanced across the first path;
the shutter can move along the first path between the closed position covering the open part of the nozzle cap in the uncapped position and the open position; and
the path switching member is disposed adjacent to the shutter in a direction along the first path.

3. The media processing device described in claim 2, further comprising:
a media guide disposed opposite the inkjet head with the first path therebetween; and
a media guide opening formed in the media guide for moving the nozzle cap to and away from the nozzle face of the inkjet head;
wherein the shutter covers the media guide opening when in the closed position, and the shutter surface on a side of the shutter facing the first path functions in the closed position as a media guide surface that guides the first medium;
a first surface of the path switching member on the side facing the first path functions in the first position as a media guide surface connecting the shutter surface to the common path guide surface located on the same side of the common path as the shutter surface; and
a second surface of the path switching member on the side facing the second path functions in the second position as a media guide surface connecting a second path guide surface of the second path on the same side as the second surface to a common path guide surface of the common path located on the same side as the second path guide surface.

4. The media processing device described in claim 3, wherein:
the nozzle cap can move reciprocally between a retracted position separated further from the first path than the uncapped position, and the capping position reached through the uncapped position; and
the nozzle cap contacts the shutter and the open part of the nozzle cap is covered when the shutter is in the closed position and the nozzle cap moves from the retracted position to the uncapped position,
the shutter is held in the open position when the nozzle cap is in the capping position and while the nozzle cap moves from the capping position to the retracted position,
the shutter moves from the open position to the closed position when the nozzle cap returns to the retracted position, and
the nozzle cap advances from the retracted position to the uncapped position and the open part of the nozzle cap is covered after the shutter moves to the closed position.

5. The media processing device described in claim 1, wherein:
the path switching member can pivot on a predetermined pivot axis and switch to the first position and second position, and
has a cam mechanism that converts reciprocal linear movement of the shutter between the closed position and the open position to rotating movement of the path switching member between the first position and the second position.

6. The media processing device described in claim 1, further comprising:
a magnetic reading unit that reads magnetic information from the first medium conveyed through the first path;
wherein the first path is a check path, and the second path is a card path.

7. The media processing device described in claim 2, wherein:
the path switching member can pivot on a predetermined pivot axis and switch to the first position and second position, and
has a cam mechanism that converts reciprocal linear movement of the shutter between the closed position and the open position to rotating movement of the path switching member between the first position and the second position.

8. The media processing device described in claim 3, wherein:
the path switching member can pivot on a predetermined pivot axis and switch to the first position and second position, and
has a cam mechanism that converts reciprocal linear movement of the shutter between the closed position and the open position to rotating movement of the path switching member between the first position and the second position.

9. The media processing device described in claim 4, wherein:
the path switching member can pivot on a predetermined pivot axis and switch to the first position and second position, and
has a cam mechanism that converts reciprocal linear movement of the shutter between the closed position and the open position to rotating movement of the path switching member between the first position and the second position.

10. The media processing device described in claim 2, further comprising:
a magnetic reading unit that reads magnetic information from the first medium conveyed through the first path;
wherein the first path is a check path, and the second path is a card path.

11. The media processing device described in claim 3, further comprising:
a magnetic reading unit that reads magnetic information from the first medium conveyed through the first path;
wherein the first path is a check path, and the second path is a card path.

12. The media processing device described in claim 4, further comprising:
a magnetic reading unit that reads magnetic information from the first medium conveyed through the first path;
wherein the first path is a check path, and the second path is a card path.

13. The media processing device described in claim 5, further comprising:
a magnetic reading unit that reads magnetic information from the first medium conveyed through the first path;
wherein the first path is a check path, and the second path is a card path.

14. A method of controlling the media processing device of claim 11, comprising:
- moving the nozzle cap from the capping position to a retracted position when printing starts;
- moving the path switching member from the second position to the first position when the shutter slides from the open position to the closed position;
- moving the nozzle cap from the retracted position to a position in contact with a back of the shutter; and
- when a time from an end of printing exceeds a preset time, moving the nozzle cap to the retracted position, and sliding the shutter from the closed position to the open position, and switching the path switching member from the first position to the second position, thereby connecting the second path to the common path.

* * * * *